(12) United States Patent
Fidrich et al.

(10) Patent No.: US 8,335,359 B2
(45) Date of Patent: Dec. 18, 2012

(54) SYSTEMS, APPARATUS AND PROCESSES FOR AUTOMATED MEDICAL IMAGE SEGMENTATION

(75) Inventors: Márta Fidrich, Szeged (HU); György Bekes, Mélykút (HU); László Ruskó, Szolnok (HU)

(73) Assignee: General Electric Company, Schenectady, NY (US)

( * ) Notice: Subject to any disclaimer, the term of this patent is extended or adjusted under 35 U.S.C. 154(b) by 1220 days.

(21) Appl. No.: 11/781,045

(22) Filed: Jul. 20, 2007

(65) Prior Publication Data

US 2009/0022375 A1    Jan. 22, 2009

(51) Int. Cl.
*G06K 9/00* (2006.01)
(52) U.S. Cl. ...................................................... 382/128
(58) Field of Classification Search .......... 382/128–134, 382/115–118, 294
See application file for complete search history.

(56) References Cited

U.S. PATENT DOCUMENTS

| | | | |
|---|---|---|---|
| 7,130,457 B2 * | 10/2006 | Kaufman et al. | 382/128 |
| 2007/0206880 A1 * | 9/2007 | Chen et al. | 382/294 |
| 2009/0080779 A1 * | 3/2009 | Chefd'hotel et al. | 382/209 |

* cited by examiner

*Primary Examiner* — Claire X Wang
(74) *Attorney, Agent, or Firm* — The Small Patent Law Group; Dean D. Small

(57) ABSTRACT

A system and process for combining multiple datasets to provide a composite dataset is described. The system includes a data collection tool, a computation engine and a memory coupled to the data collection tool and computer-readable code embodied on a computer-readable medium. The computer-readable code is configured so that when the computer-readable code is executed by one or more processors associated with the computation engine the computer-readable code causes the one or more processors to: (i) accept two or more datasets corresponding to distinct measurements of a subject, (ii) initiate processing of the two or more datasets, (iii) contemporaneously segment and register a combination of the two or more datasets to achieve a combined dataset, (iv) test for convergence of the combined dataset and (v) provide the combined dataset for analysis when the test for convergence indicates that the combined dataset has been registered and segmented.

25 Claims, 10 Drawing Sheets

(5 of 10 Drawing Sheet(s) Filed in Color)

SYSTEMS, APPARATUS AND PROCESSES FOR AUTOMATED MEDICAL IMAGE SEGMENTATION

FIELD OF THE DISCLOSURE

This disclosure relates generally to anatomical data processing technology, and in particular to systems, apparatus and processes for preparing anatomical data assembled from more than one dataset for multiple applications via a flexible, automated content enhancement tool.

BACKGROUND

Many medical diagnostic, surgical and interventional procedures rely on imaging tools to provide information descriptive of status of visually perceived representations of portions or organs of a patient. In part as a result of increasing sophistication of medical tools in general, and imaging apparatus in particular, more types of imaging devices are being adapted for application in the context of surgical procedures.

In many instances, medical tools capable of rendering images of organs or tissues have found great utility and have been adapted to facilitate types of surgery or other medical treatment. These find application in many situations, and are very useful in situations where the surgeon cannot directly see the operating site, or when the features of interest are not amenable to direct visual inspection, or to enable comparison of a present image with other image data, among other instances. These applications have resulted in development of a broad variety of tools, including x-ray, CT and fluoroscopic visualizing aids, magnetic resonance imaging apparatus and techniques, and many different types of optical imaging devices.

In many imaging applications, pixelated detectors are increasingly employed to realize electronic digital representations of image data. In turn, digital techniques provide great imaging flexibility, such as, for example, overlay or direct comparison, on the fly, of various aspects and views from various times. For example, pre-surgery images can be available, in real time, in the operating room scenario, for comparison to images reflective of the present status of the same tissues. Many other types of special-purpose enhancements are now also possible. In some instances, imaging aids, such as contrast-enhancing agents, are introduced into the subject or patient to aid in increasing available data content from the imaging technique or techniques being employed.

Increasing sophistication of these visualization apparatus also results in significant cost, not only develop these devices, but also to acquire them, to train operators in using them, and service technicians to maintain them, and in educating physicians to be familiar with their capabilities and benefits. As a result, a significant investment is involved with respect to each such tool.

The advent of digital imaging technologies resulted in a large number of new medical applications and usages for imaging tools. Initially, two-dimensional images were formed using recording media, and, subsequently, of picture elements or pixels. However, more sophisticated techniques evolved capable of realizing datasets of volume-descriptive data comprising aggregations of unit cells, known as voxels. A rich variety of different techniques for employing such voxels to provide information have followed that evolution, coupled with a desire for ability to employ progressively lower radiation doses in order to be able to form detailed anatomical descriptions.

Digital images are made up of pixels, and these images are generally visualized by assigning each pixel a numerical value corresponding to a color or a shade of gray, and then displaying that assigned representation in the corresponding position for that pixel on a graphical display. A digital image can be adjusted by varying the numerical values of each pixel, for example by forming each pixel as a weighted combination of images formed at different times, or formed from illumination from different spectral components or by combining images including fluorescent image data and reflected image data. Raw image data may be manipulated by software using algorithms and mathematical computations to optimize particular aspects providing information about structures in the subject. These types of images, alone or in combination with other data, provide useful tools for improving medical procedures.

Imaging of soft tissues, in particular, presents challenges in developing high contrast between normal tissue and various types of pathologies. Segmentation of images is necessary for a number of different medical applications, including surgery planning, radiotherapy planning and other fields of use. Segmentation by hand of images of soft tissue can present labor-intensive aspects. Additionally, when data from multiple images are to be combined, the various images must be registered with one another, and the quality of the segmentation depends strongly on the accuracy of the registration. Further, many of the tools developed for these individual tasks are highly specific, for example, specific to a particular organ or modality specific, and require user interaction.

For the reasons stated above, and for other reasons discussed below, which will become apparent to those skilled in the art upon reading and understanding the present disclosure, there are needs in the art to provide more highly automated image computation engines, and more generally-applicable protocols for application and usage of such capabilities, in order to streamline gathering and analysis of information in support of increasingly stringent and exacting performance and economic standards in settings such as medical imaging.

BRIEF DESCRIPTION

The above-mentioned shortcomings, disadvantages and problems are addressed herein, which will be understood by reading and studying the following disclosure.

In one aspect, a system for combining multiple datasets to provide a composite dataset is contemplated. The system includes a data collection tool, a computation engine, a memory coupled to the data collection tool and computer-readable code embodied on a computer-readable medium. The computer-readable code is configured so that when the computer-readable code is executed by one or more processors associated with the computation engine, the computer-readable code causes the one or more processors to (i) accept two or more datasets corresponding to distinct measurements of a subject, (ii) initiate processing of the two or more datasets, (iii) contemporaneously segment and register a combination of the two or more datasets to achieve a combined dataset, (iv) test for convergence of the combined dataset and (v) provide a registered and segmented composite dataset for analysis when the test for convergence indicates that the composite dataset has been registered and segmented.

In another aspect, an apparatus is disclosed. The apparatus is configured for accepting two or more datasets composed of voxels corresponding to digitized versions of distinct measurements of a subject. The apparatus is also configured for initiating processing of the two or more datasets, contemporaneously segmenting and registering a combination of the two or more datasets to achieve a combined dataset and testing the combined dataset for convergence. The apparatus is further configured for providing the combined dataset for analysis when testing indicates that the combined dataset has been registered and segmented.

In a further aspect, the present disclosure teaches a process for contemporaneously registering and segmenting multiple input datasets to provide an integrated dataset formed from the multiple input datasets. The process includes (i) accepting two or more datasets composed of voxels corresponding to digitized versions of distinct measurements of a subject, (ii) initiating processing of the two or more datasets, (iii) contemporaneously segmenting and registering a combination of the two or more datasets to achieve a combined dataset, (iv) testing the combined dataset for convergence and (v) providing the combined dataset for analysis when testing indicates that the combined dataset has been registered and segmented.

In yet another aspect, the present disclosure describes a process for segmenting multiple registered input datasets each corresponding to a measurement to provide an integrated dataset formed from the multiple registered input datasets. The process includes accepting two or more registered datasets derived from data corresponding to digitized versions of distinct measurements of a subject and initiating processing of the two or more datasets. The process also includes segmenting a combination of the two or more registered datasets to achieve a combined dataset and providing a composite dataset, formed using the combined dataset, for further analysis, when the combined dataset has been appropriately segmented.

Systems, processes, and computer-readable media of varying scope are described herein. In addition to the aspects and advantages described in this summary, further aspects and advantages will become apparent by reference to the drawings and by reading the following detailed description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
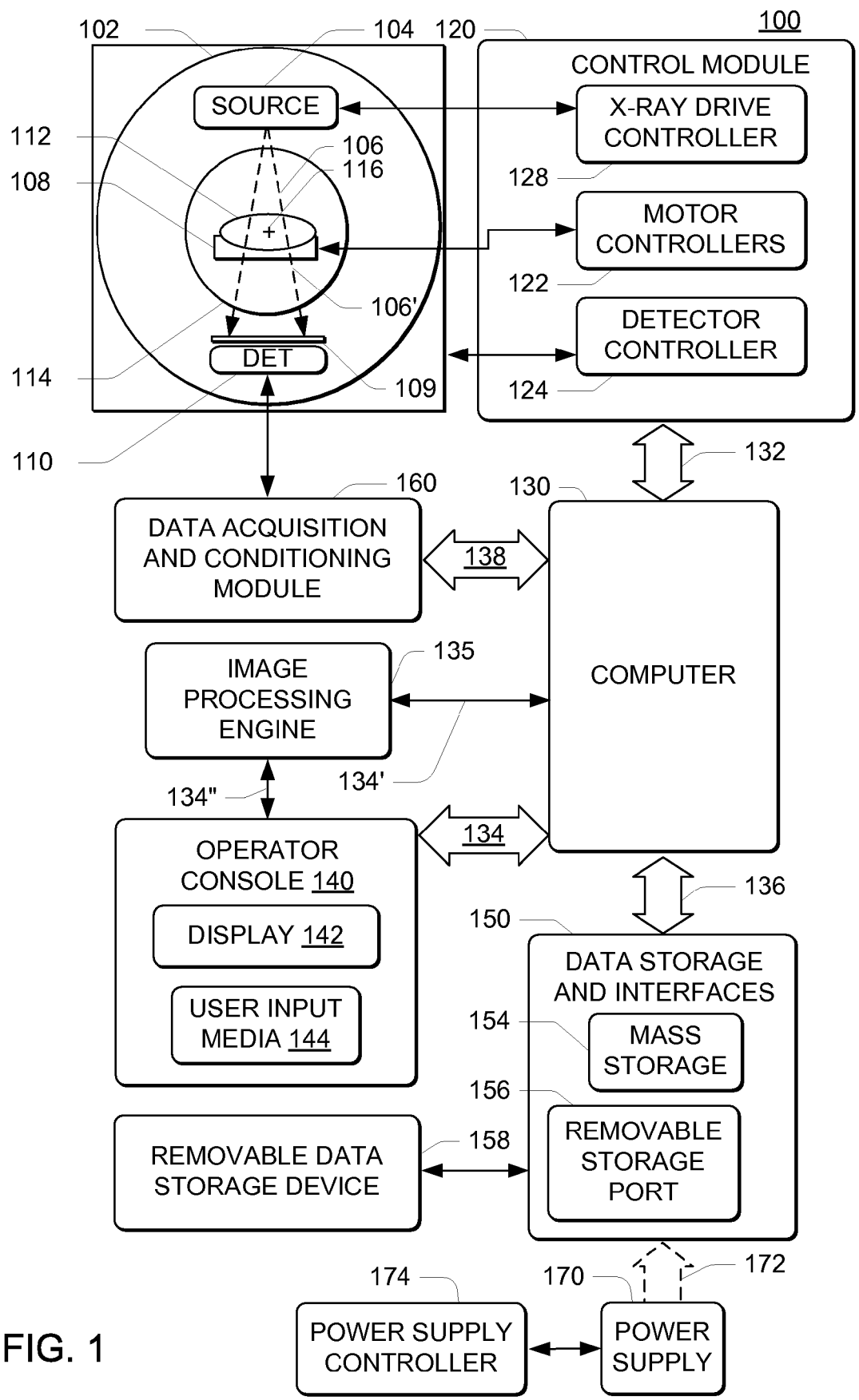
FIG. 1 is a block diagram of a system configured to provide and then enhance two- or three-dimensional anatomical data in conformance with one or more purpose-specific applications.

In the following detailed description, reference is made to the accompanying drawings that form a part hereof, and in which are shown, by way of illustration, specific embodiments that may be practiced. These embodiments are described in sufficient detail to enable those skilled in the art to practice the embodiments, and it is to be understood that other embodiments may be utilized, and that logical, mechanical, electrical and other changes may be made, without departing from the scope of the embodiments.

The detailed description is divided into seven sections. In the first section, a system level overview is provided. In the second section, examples illustrating dataset registration are described. In the third section, segmentation is discussed. The fourth section includes explanation of models for organs, derived from measured data, and the usage of such models.

The fifth section presents a process for implementation of the techniques and discoveries disclosed herein. The sixth section discloses hardware and an operating environment, in conjunction with which embodiments may be practiced. The seventh section provides a conclusion which reviews aspects of the subject matter described in the preceding segments of the detailed description. A technical effect of the subject matter described herein includes automated contemporaneous registration and segmentation of three-dimensional anatomical data formed from combinations of datasets, using a single software tool, for purposes including rendering of two or three dimensional visual simulations of internal anatomical features, or automated detection of specific types of pathology from the same two- or three-dimensional anatomical data, or for quantification of pathological tissues, also from the same two- or three-dimensional anatomical data.

As used herein, the term "Hounsfield Units" or the abbreviation "HU" refers to units employed for mapping effective linear X-ray attenuation coefficients which comprise X-ray or Computer-aided Tomographic (CT) images to a convenient standard numeric scale. Values on this scale are expressed in Hounsfield Units (HU) and are sometimes referred to as CT numbers. On the HU scale, the value of water in a CT image is zero and the value of air is −1000.

As used herein, the term "pixel" means a two-dimensional unit cell or elementary picture element in a display. As used herein, the term "voxel" means a three-dimensional unit cell for representation of three-dimensional data fields. Pixels and voxels have a set of values associated with them.

Segmentation, in the sense used here, involves differentiating between data representing various organs. Segmentation may also include identifying data describing pathological features. Segmentation may be employed to clearly define organs, or for quantification of the size of a lesion. As used herein, the term "segmentation" means the process of partitioning a digital image into multiple regions (sets of pixels), or of partitioning a digital three-dimensional representation into multiple regions (sets of voxels). The goal of segmentation is to simplify and/or change the representation of a dataset into something that is more meaningful and as a way of facilitating analysis and quantification of features of interest. Image segmentation is typically used to locate objects and boundaries (lines, curves, etc.) in images, with similar processes being employed with volumetric data.

The result of segmentation is a set of regions that may collectively cover the entire image or volumetric dataset, or a set of contours extracted from the image or volumetric dataset via edge detection and other conventional signal or image processing techniques. Each of the pixels or voxels in a given region are similar with respect to some characteristic or computed property, such as color, intensity or texture. Adjacent regions are significantly different with respect to the same characteristic(s).

As used herein, the term "phase" is used to distinguish between measurements taken at a time when a specific biological activity is at a specific stage. For example, the term "arterial phase" refers to a time when contrast agent is visible primarily in the heart and arteries, whereas the term "venous phase" is used to refer to a time when contrast agent is visible in the portal vein of the liver. Other phases may be defined as corresponding to different portions of the cyclical pumping action of the heart or with reference to other indicia.

As used herein, the term "histogram" refers to a function which assigns a probability to each intensity value. This probability shows the probability of a voxel or pixel to have this intensity. For example, a probability of 0.5 for an intensity of 100 Hounsfield Units means that half of the voxels or pixels have a value of 100 Hounsfield units. Histograms may relate to a single image, or may relate to two or more images.

As used herein, the term "registration" means alignment of features contained in at least portions of two or more images to establish multiple points representative of the same physical feature. In other words, data elements representing corresponding portions of each of two or more datasets are co-located or coordinated to allow meaningful combination of the elements of the two or more datasets.

§I. SYSTEM OVERVIEW

FIG. 1 is a simplified diagram of an overview of a modified system 100 configured to improve X-ray imaging operations. The system 100 optionally includes a gantry 102 or other support for an illumination source 104, such as an X-ray illumination source, capable of providing illumination 106, such as X-rays or other non-destructive internal imaging illumination, and may optionally include a test subject support 108 that is transmissive with respect to the illumination 106 and that is positioned above a scintillator 109 and detector 110 that is also opposed to the illumination source 104. Alternatively, a direct conversion detector 110 may be employed without need for a scintillator.

In one embodiment, components of the system 100 and a test subject 112 are maintained in a defined geometric relationship to one another by the gantry 102. A distance between the illumination source 104 and the detector 110 may be varied, depending on the type of examination sought, and the angle of the illumination 106 respective to the test subject 112 can be adjusted with respect to the body to be imaged responsive to the nature of imaging desired.

In one embodiment, the test subject support 108 is configured to support and/or cause controlled motion of the test subject 112, such as a living human or animal patient, or other test subject 112 suitable for non-destructive imaging, above the scintillator 109/detector 110 so that illumination 106' is incident thereon after passing through the test subject 112. In turn, information from the detector array 110 describes internal aspects of the test subject 112.

The scintillator 109 may be a conventional CsI scintillator 109, optically coupled to an array of photodiodes (not illustrated), such as a two-dimensional array of photodiodes and suitable control transistors formed using semiconductor material such as amorphous silicon, or any other form of detector 110 suitable for use with the type or types of illumination 106 being employed, such as X-rays. The detector elements are typically tesselated in a mosaic. The scintillator 109 converts incident photons comprising electromagnetic radiation, such as X-rays, from high-energy, high-frequency photons 106', into lower-energy, lower-frequency photons corresponding to spectral sensitivity of the detector elements, in a fashion somewhat analogous to fluorescence, as is commonly known in the context of many visible-light sources in use today. Alternatively, the detector 110 may be formed as a flat-panel array including amorphous Silicon (α-Si) active elements, together with either a scintillator layer 109, or a direct converter material such as Cadmium Zinc Telluride (CdZnTe), Mercuric Iodide ($HgI_2$), Lead Iodide ($PbI_2$), or amorphous Selenium (α-Se).

In some modes of operation, such as CT, the gantry 102 and test subject support or table 108 cooperatively engage to move the test subject 112 longitudinally within an opening 114, that is, along an axis 116 extending into and out of the plane of FIG. 1. In some modes of operation, the gantry 102 rotates the X-ray source 104 and detector 110 about the axis 116, while the support 108 moves longitudinally, to provide a helical series of scans of the test subject 112, where a pitch of the helices is defined as a ratio of a longitudinal distance traveled by the table 108 during a complete revolution of the gantry 102, compared to a length of the detector 110 along the axis 116 of linear motion.

The system 100 also optionally includes a control module or controller 120. The controller 120 may include a motor control module 122 configured to move the test subject support 108 and thus the test subject 112 relative to the X-ray source 104 and/or detector 110, and may also control motors in the gantry 102 or to position the X-ray illumination source 104 relative to the test subject 112 and/or the detector 110.

The controller 120 includes a detector controller 124 configured to control elements within the detector 110 and to facilitate data transfer therefrom. The controller 120 also includes a drive parameter controller 128 configured to control electrical drive parameters delivered to the X-ray source 104. One or more computers 130 provide connections to the controller 120 via a bus 132 configured for receiving data descriptive of operating conditions and configurations and for supplying appropriate control signals. Buses 134, 134' and 134" act to transfer data and control signals, for example with respect to a module 135, configured as an image processing engine, via interconnections such as 134', 134" that are configured for exchange of signals and data to and/or from the computer 130 as well as other elements of the system 100 and/or external computation or communications resources (not illustrated in FIG. 1).

The system 100 also includes a bus 136, a bus 138 and an operator console 140. The operator console 140 is coupled to the system 100 through the bus 134. The operator console 140 includes one or more displays 142 and a user input interface 144. The user input interface 144 may include a touchscreen, keyboard, a mouse or other tactile input device, capability for voice commands and/or other input devices. The one or more displays 142 provide video, symbolic and/or audio information relative to operation of system 100, user-selectable options and images descriptive of the test subject 112, and may display a graphical user interface for facilitating user selection among various modes of operation and other system settings.

The image processing engine 135 facilitates automation of accurate measurement and assessment. The image processing engine 135 is capable of forming multiple, coordinated images for display, for example via the monitor 142, to provide the types of depictions described below. The image processing engine 135 may comprise a separate and distinct module, which may include application-specific integrated circuitry, or may comprise one or more processors coupled with suitable computer-readable program modules, or may comprise a portion of the computer 130 or other computation device.

The system 100 also includes memory devices 150, coupled via the bus 136 to the computer 130 through suitable interfaces. Datasets representing three-dimensional data and image or two-dimensional data typically conform to the digital imaging and communications in medicine (DICOM) standard, which is widely adopted for handling, storing, printing, and transmitting information in medical imaging. The DICOM standard includes a file format definition and a network communications protocol. The communication protocol is an application protocol that uses TCP/IP to communicate between systems. DICOM files can be stored in memory devices 150 and retrieved therefrom, and may be exchanged between two entities that are capable of receiving image and patient data in DICOM format.

The memory devices 150 include mass data storage capabilities 154 and one or more removable data storage device ports 156. The one or more removable data storage device ports 156 are adapted to detachably couple to portable data memories 158, which may include optical, magnetic and/or semiconductor memories and may have read and/or write capabilities, and which may be volatile or non-volatile devices or may include a combination of the preceding capabilities.

The system 100 further includes a data acquisition and conditioning module 160 that has data inputs coupled to the detector 110 and that is coupled by the bus 138 to the one or more computers 130. The data acquisition and conditioning module 160 includes analog to digital conversion circuitry for capturing analog data from the detector 110 and then converting those data from the detector 110 into digital form, to be supplied to the one or more computers 130 for ultimate display via at least one of the displays 142 and for potential storage in the mass storage device 154 and/or data exchange with remote facilities (not shown in FIG. 1). The acquired image data may be conditioned in either the data acquisition and conditioning module 160 or the one or more computers 130 or both.

The system 100 also includes a power supply 170, coupled via interconnections represented as a power supply bus 172, shown in dashed outline, to other system elements, and a power supply controller 174. In some embodiments, the system 100 is configured to be a mobile system equipped with a portable power supply 170, such as a battery. In other words, the system 100 may comprise a wheeled unit and may be electromotively powered in self-contained fashion, lending physical agility to the ensemble of attributes offered by the system 100.

Volumetric data collected via exposure of the test subject 112 to suitable illumination 106 may be processed via many different types of tools, each intended to enhance some portion of information content described by the data. One result can be inconsistency between analytical results from different types of signal processing tools, or between measurement results corresponding to different measurement times and/or measurement phases. Aspects of the measurement processes, problems and analysis are discussed below with reference to §§II through V.

§II. REGISTRATION

Figure 7:
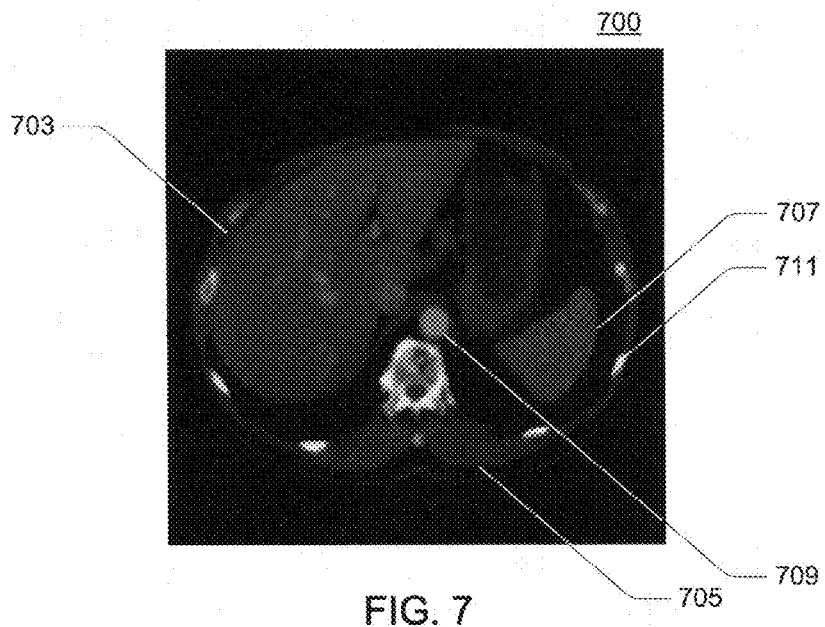
FIG. 7 displays a combination of data used to form the images of FIGS. 5 and 6, in accordance with an embodiment of the disclosed subject matter.

In the following section, some aspects involved in identifying particular tissue types or organs in order to register multiple datasets are described with reference to FIGS. 2 through 4 in the context of measurements corresponding to two or more phases. FIGS. 5 through 7 illustrate multiple phase measurements and results associated with combining registered images. FIGS. 8 through 11 illustrate images formed by combining multiple datasets and corresponding histograms, demonstrating the effects of varying degrees of registration.

Quantitation of suspicious objects, i.e. lesions, plays a critical role in assessing malignancy (in growth), or effect of therapy (in stabilizing or shrinking of size). Lesions that are in high contrast anatomical areas (i.e. lung, colon) are easier to segment and quantify, and thus are more readily studied using automated tools, than those in lower contrast areas (i.e. liver, kidneys, brain etc). In computerized tomographic imaging, the low contrast regions are artificially enhanced using contrast injection to make lesions prominent for detection and quantification.

Use of contrast agents alone, however, does not always provide adequate contrast between different tissue types or organs or the various kinds of lesions which may be present. The discussion below with reference to FIGS. 2 through 7 illustrates a new modality for automatically combining multiple images to increase contrast even further.

Figures 2, 3:
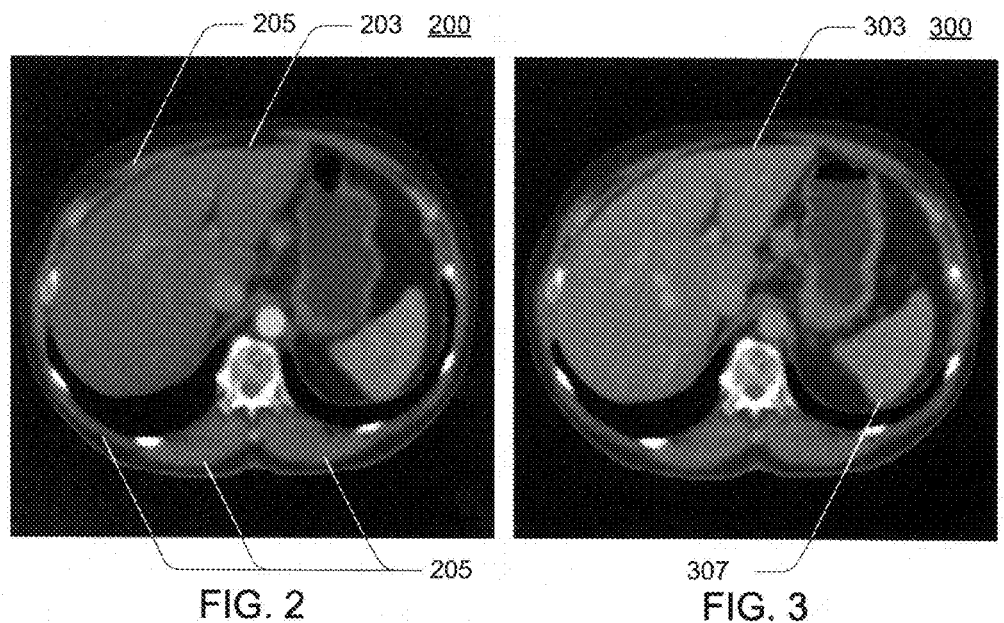
FIGS. 2 and 3 represent images from an arterial phase and a venous phase, respectively, of a contrast-enhanced computerized tomography liver examination, in accordance with an embodiment of the disclosed subject matter.

FIGS. 2 and 3 represent an image 200 from an arterial phase liver measurement and an image 300 from a venous phase liver measurement, respectively, made using contrast-enhanced computer aided tomography, in accordance with an embodiment of the disclosed subject matter. In the image 200 from the arterial phase measurement, liver 203 and muscles 205 show similar intensity. In the image 300 from the venous phase measurement, liver 303 and spleen 307 show similar intensities. In FIG. 2, the intensity range for the liver 203 overlaps with the intensity range for the muscles 205, and in FIG. 3, the intensity range for the liver 303 overlaps with the intensity range for the spleen 307. As a result, while specifying an intensity range may be a necessary condition for automated segmentation of such data, intensity ranges alone are not sufficient for permitting such automated signal processing.

Figure 4:
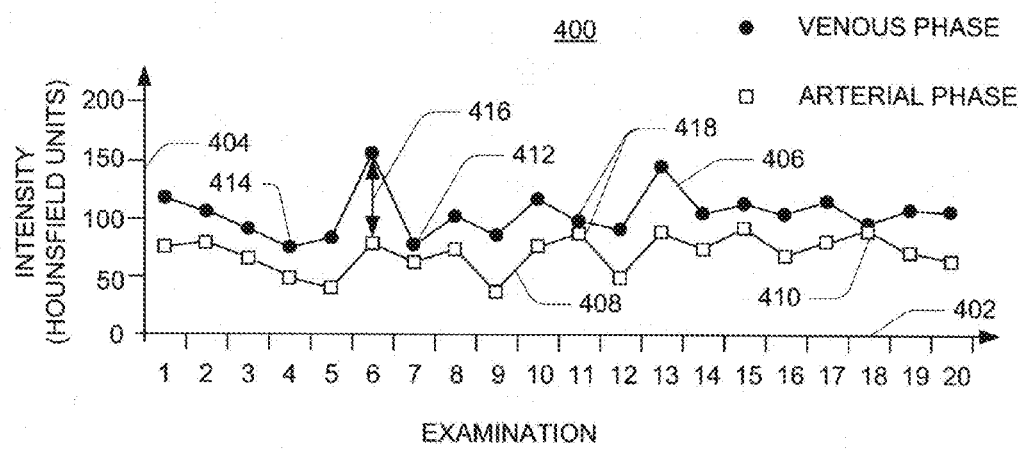
FIG. 4 graphically depicts intensity of the liver for venous phase (upper trace, circles represent data points) and arterial phase (lower trace, squares represent data points) images over a series of twenty contrast-enhanced liver examinations, in accordance with an embodiment of the disclosed subject matter.
Figures 5, 6:
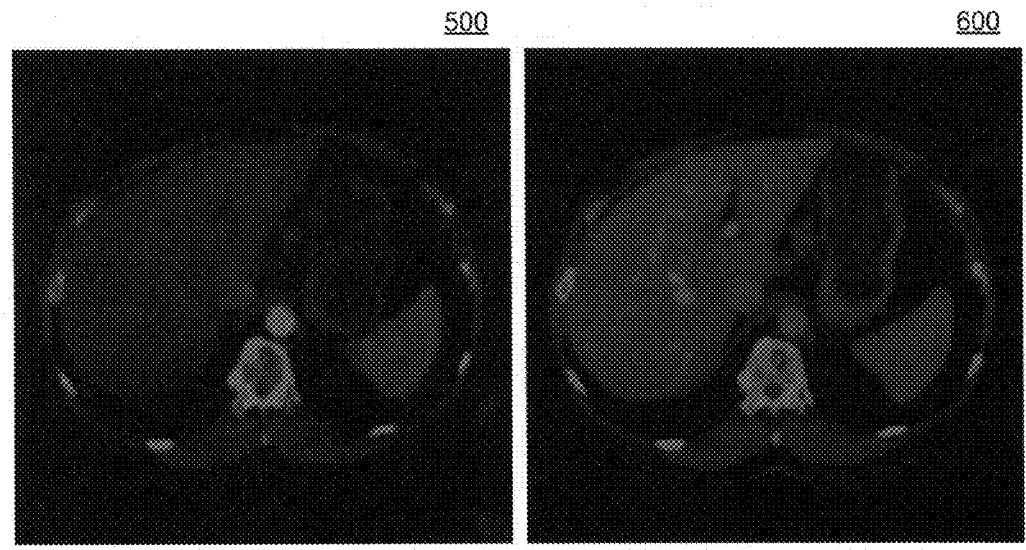
FIG. 5 provides a representation, using a red palette, of an arterial phase measurement, in accordance with an embodiment of the disclosed subject matter.
FIG. 6 illustrates, using a green palette, a venous phase measurement of the subject employed to derive the image of FIG. 5, in accordance with an embodiment of the disclosed subject matter.

FIG. 4 shows a graph 400 depicting mean intensity of the liver for several phases over a series of twenty contrast-enhanced liver measurement pairs, in accordance with an embodiment of the disclosed subject matter. The graph 400 includes an abscissa 402 and an ordinate 404. The abscissa 402 corresponds to a numbered series of measurements, while the ordinate 404 is calibrated in intensity over a predetermined range, which is zero to two hundred Hounsfield Units in this instance.

The data provided via the graph 400 shows a series of venous phase measurements 406, with individual measurements being represented by circles (upper trace). A corresponding series of arterial phase measurements 408 form a lower trace with individual data points represented by hollow squares. The example of FIG. 4 uses mean liver intensity measurements, because liver parenchyma provides rather uniform intensity.

The graph 400 illustrates several of the complexities encountered in the context of automated data processing (such as registration or segmentation) as a result of variations from one measurement to another. These arise because the intensity of liver parenchyma may vary, and, accordingly, will not necessarily be known a priori. More generally, the intensity achieved in any particular dataset is a complex function of exposure conditions, the type of contrast agents, if any, employed and the blood circulation of the patient when the measurement is performed, among other things.

Comparison of the traces 406 and 408 shows that in general, the venous phase, represented by the trace 406, typically presents greater intensity than the arterial phase, illustrated by the trace 408. However, the intensity of the arterial phase 408 of measurement eighteen, denoted by reference character 410, is greater than the intensity of the venous phases of measurements 406 four and seven, denoted by reference characters 412 and 414, respectively.

Additionally, the intensity variations measured within each of the arterial 408 and venous 406 phases varies significantly. For example, a large difference between the venous phase 406 and the arterial phase 408 is indicated by the separation 416 therebetween shown in measurement six. In contrast, the separation between the venous phase 406 and the arterial phase 408 seen in measurement eleven, indicated by reference character 418, is too small to be explicitly identified in FIG. 4. As a result, techniques for either or both image registration and image segmentation (described below in more detail in §V with reference to FIGS. 17 and 18) need to be able to comprehend these kinds of variations in intensity.

In segmentation to characterize liver characteristics, the liver is often assumed to be the abdominal organ with the largest volume. This obviously is not the case for other organs, and, in rare cases, it isn't true for the liver, either. Consequently, simple rules, methods or algorithms, based on intensity ranges, intensity limits or size, are not adequate for general automated registration or segmentation processes. As a result, sophisticated techniques having substantial flexibility are needed in order to determine a suitable intensity range for meaningful representation (providing, for example, significant diagnostic value) of the organ of interest in each measurement.

FIG. 5 provides a representation, using a red palette, of an arterial phase measurement 500 (analogous to the image 200 of FIG. 2), in accordance with an embodiment of the disclosed subject matter. FIG. 6 illustrates, using a green palette, a venous phase measurement 600 (analogous to the image 300 of FIG. 3) of the subject employed to derive the image 500 of FIG. 5, in accordance with an embodiment of the disclosed subject matter.

FIG. 7 displays an image 700 representing a combination of the data used to form the images 500 and 600 of FIGS. 5 and 6, respectively, in accordance with an embodiment of the disclosed subject matter. In the combined view 700, liver parenchyma 703 is shown in green, muscles 705 are represented as being dark brown, spleen 707 is shown in lighter brown, an artery 709 is shown in orange and bony structures 711 are displayed in yellow.

As a result, features within the liver 703, as exemplified in FIG. 7, are more readily separable from other elements in the image 700 than was possible in either the original arterial phase image 200 of FIG. 2 (corresponding to the image 500 of FIG. 5) or the original venous phase image 300 of FIG. 3 (corresponding to the image 600 of FIG. 6). Other major anatomical structures are also more readily distinguished than was possible in either the original arterial phase image 200 of FIG. 2 or the original venous phase image 300 of FIG. 3.

In order to combine the data corresponding to arterial and venous phase images 500 of FIGS. 5 and 600 of FIG. 6, respectively, to obtain the data used to form the image 700 of FIG. 7, corresponding anatomical features need to be identified within each of the respective arterial and venous phase images 500 and 600, to coordinate alignment or registration of corresponding data elements, such as pixel or voxel data, representing the same anatomical portion of the organs in the multiple datasets.

As is described below in more detail with reference to FIGS. 8 through 11 and associated text, it may be possible to identify some features in images which are formed by combining two or more poorly registered datasets. However, a great deal of information, particularly for smaller anatomical features, is lost, when registration is incomplete or inadequate, and segmentation is unlikely to provide useful data from such combined datasets.

Figure 8:
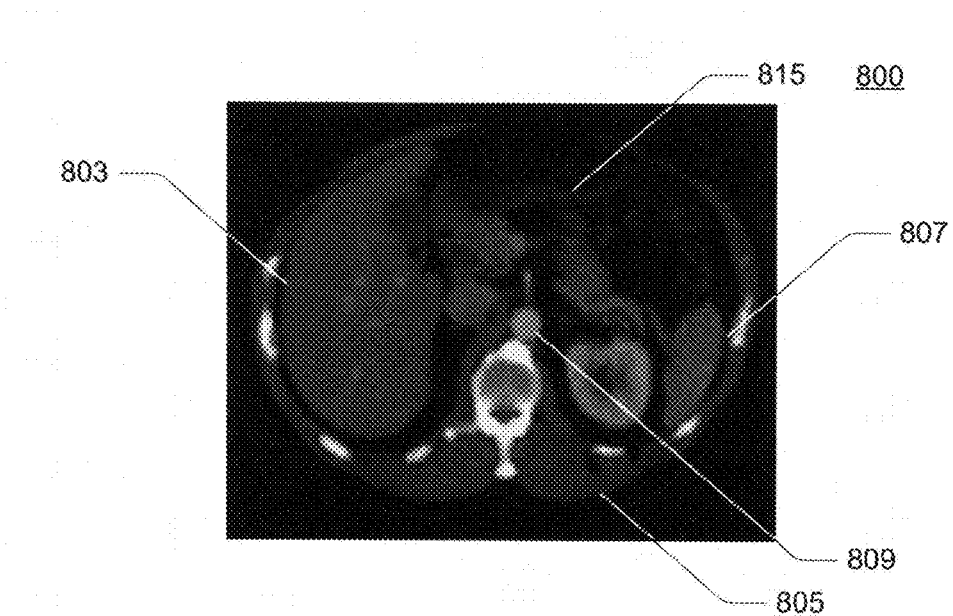
FIG. 8 includes an image formed by a registered combination of data from two phases, in accordance with an embodiment of the disclosed subject matter.
Figure 9:
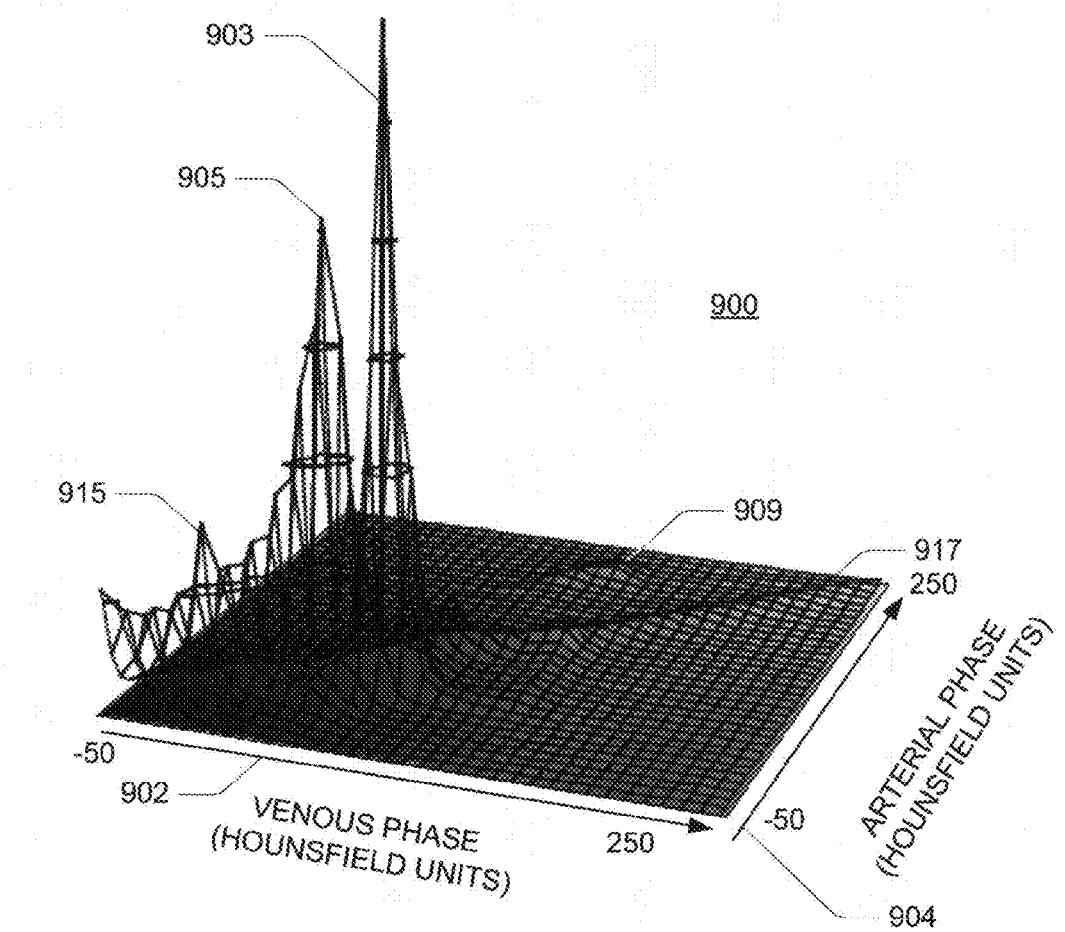
FIG. 9 shows a histogram corresponding to the image of FIG. 8, in accordance with an embodiment of the disclosed subject matter.

FIG. 8 includes an image 800 formed by a registered combination of two phases and FIG. 9 provides a corresponding two-phase histogram 900, in accordance with an embodiment of the disclosed subject matter. The image 800 includes an image of a liver 803, musculature 805, spleen 807, artery 809 and bowel 815.

The two-phase histogram 900 of FIG. 9 includes a first axis 902, corresponding to the venous phase, a large peak 903 which is the modus for the histogram 900, and a second axis 904, corresponding to the arterial phase. The first and second axes 902 and 904 are both calibrated in Hounsfield Units, over a range from −50 to 250. FIG. 9 also includes peaks 905, 909, 915 and a clearly-defined diagonal peak 917. The liver 803 of FIG. 8 corresponds to the large peak 903 in the histogram 900 of FIG. 9. Each of the peaks 905, 909, 915, etc. corresponds to a particular organ, in this instance, to the musculature 805, arterial structure 809 and bowel 815, respectively.

Multiphase histograms such as the two-phase histogram 900 of FIG. 9 can be manipulated in a variety of ways to derive a difference metric for registration. One way is to minimize the difference between the histogram and a stored version of an expected histogram that is based on data from multiple exams. Additionally, contrast agent intake is not significant in most parts of the body (such as portions comprising air, fat, bones), so a large portion of the voxels representing the body portion being studied have nearly the same intensity in all phases. These correspond to the diagonal peak 917 seen in FIG. 9.

Figure 10:
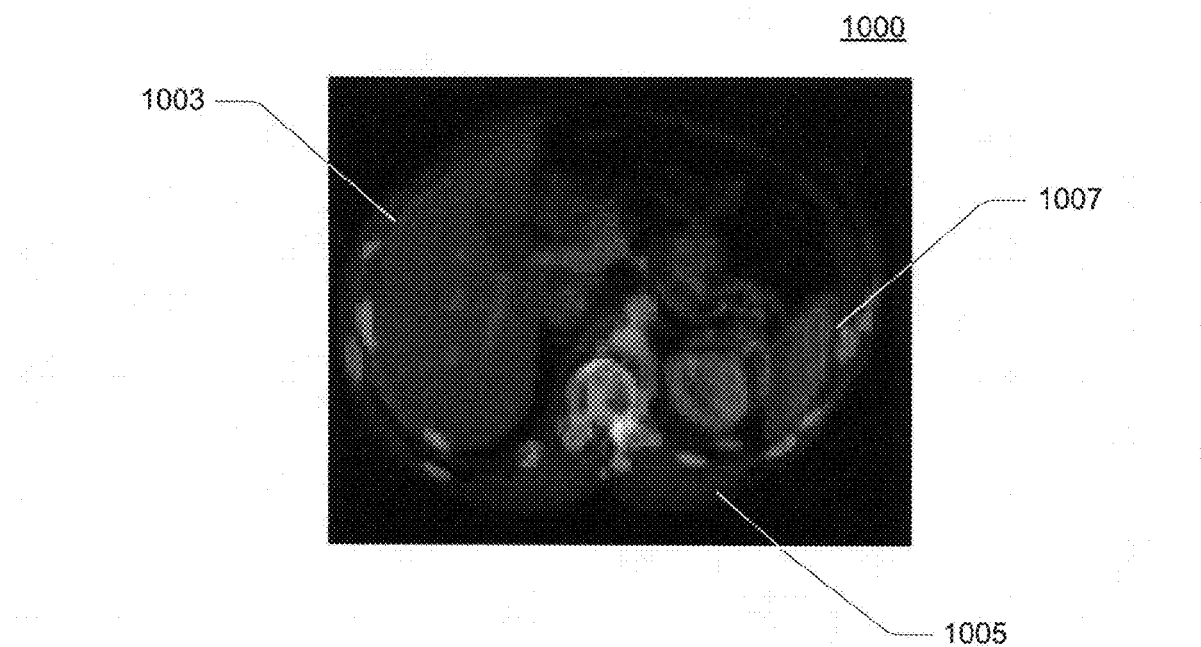
FIG. 10 includes an image formed by a poorly registered combination of two phases, in accordance with an embodiment of the disclosed subject matter.
Figure 11:
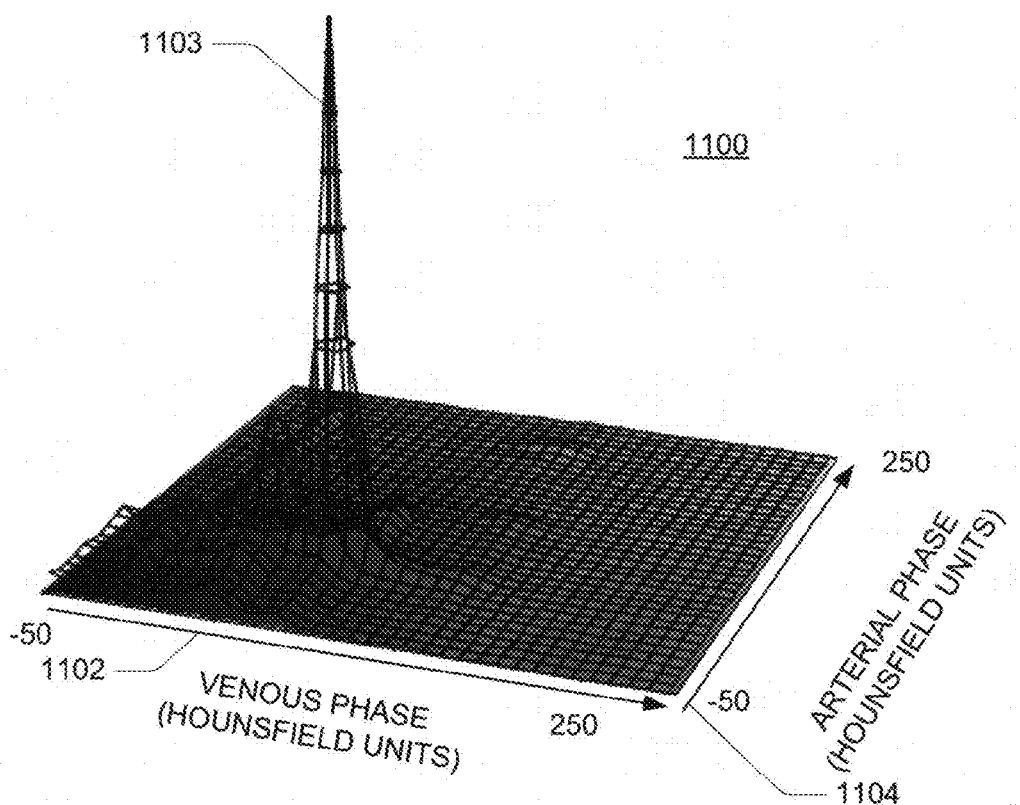
FIG. 11 shows a histogram corresponding to the image of FIG. 10, in accordance with an embodiment of the disclosed subject matter.

FIG. 10 includes an image 1000 formed by a roughly registered combination of the datasets for same two phases as used in FIGS. 8 and 9, and FIG. 11 is a histogram 1100 corresponding to the image 1000 of FIG. 10, in accordance with an embodiment of the disclosed subject matter. Rough registration may be accomplished using slice information such as is stored in the DICOM header associated with each dataset or image.

The histogram 1100 includes a first axis 1102, corresponding to the venous phase, a major peak 1103 or modus, and a second axis 1104, corresponding to the arterial phase. The first and second axes 1102 and 1104 are both calibrated in Hounsfield Units, over a range from −50 to 250.

When the different phases are only roughly registered, it is very difficult to segment the image based on multiphase histogram analysis. As a result, accurate registration is very important for meaningful segmentation. Note that there is no feature in FIG. 11 corresponding to the diagonal peak 917 of FIG. 9. This shows that multiphase histogram-based image metric can effectively distinguish between differences due to contrast intake and registration error. False peaks which do not correspond to any organ model may also manifest histograms formed using roughly registered datasets.

Figure 12:
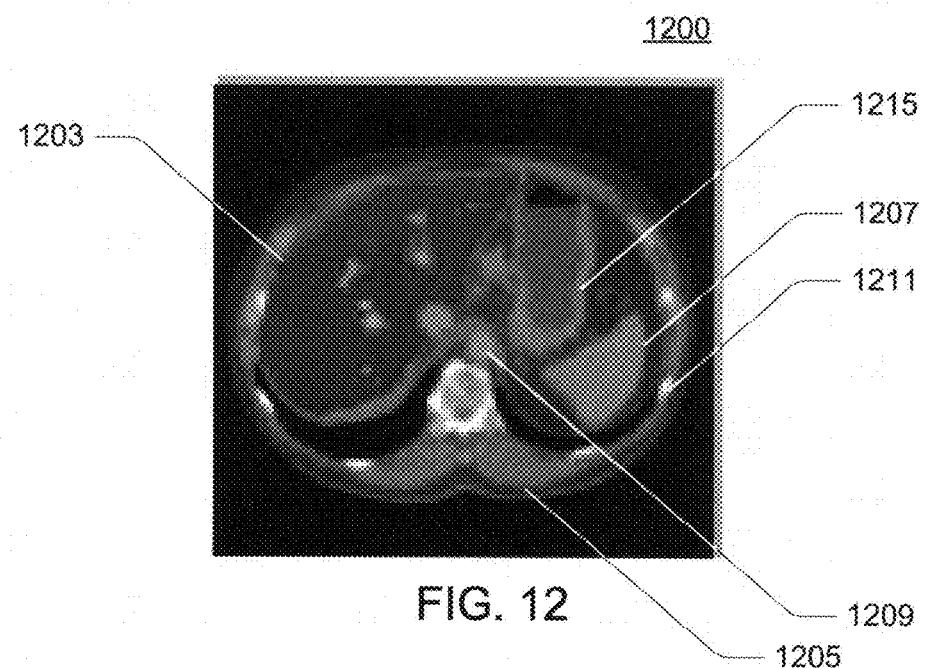
FIG. 12 illustrates voxels (dark green), the intensity of which is nearly 30 HU at the arterial image and 80 HU at the venous image of FIGS. 5 and 6, respectively, in accordance with an embodiment of the disclosed subject matter.

FIG. 12 provides a depiction 1200 illustrating pixels (dark green) in a liver 1203, the intensity of which is nearly 30 HU at the arterial and 80 HU at the venous phase (which corresponds to the location of the largest peak 903 in the two-phase histogram 900 of FIG. 9) in accordance with an embodiment of the disclosed subject matter. FIG. 12 also shows muscles 1205, spleen 1207, bony tissue 1211 and bowel 1215.

The image 1200 depicted in FIG. 12 illustrates that the voxels representing the liver 1203 in the dataset formed by combining datasets from multiple phases can provide clear identification of liver tissue 1203 and thus promotes successful segmentation of the data representing the liver 1203 with respect to other data in the combined dataset. Segmentation is discussed in more detail below with respect to §III.

§III. SEGMENTATION

Some of the practical applications of image or volumetric segmentation in medical imaging include locating and quantifying tumors and other pathologies; measurement of tissue volumes; computer-guided surgery; diagnosis; treatment planning (e.g., for transplantation, or for insertion of foreign materials into the body); and study of anatomical structure. Several general-purpose algorithms and techniques have been developed for image or adapted to volumetric data segmentation.

Clustering Methods. K-Means Clustering is an iterative technique that is used to partition an image into K clusters. The basic algorithm is: (1) Pick K cluster centers, either randomly or based on some heuristic. (2) Assign each pixel in the image to the cluster that minimizes the variance between the pixel and the cluster center. (3) Re-compute the cluster centers by averaging all of the pixels in the cluster. (4) Iterate (2) and (3) until convergence is attained (e.g., no pixels change clusters).

In this case, variance is the squared or absolute difference between a pixel and a cluster center. The difference is typically based on pixel color, intensity, texture, and location, or a weighted combination of these factors. K can be selected manually, randomly, or by a heuristic.

This algorithm is guaranteed to converge, but it may not return the optimal solution. The quality of the solution depends on the initial set of clusters and the value of K.

Histogram-Based Methods. Histogram-based methods are very efficient when compared to other image segmentation methods because they typically require only one pass through the pixels. In this technique, a histogram is computed from all of the pixels in the image, and the peaks and valleys in the histogram are used to locate the clusters in the image. Color or intensity can be used as the measure.

A refinement of this technique is to recursively apply the histogram-seeking method to clusters in the image in order to divide them into smaller clusters. This is repeated with smaller and smaller clusters until no more clusters are formed.

One disadvantage of the histogram-seeking method is that it may be difficult to identify significant peaks and valleys in the image. As an example, see FIG. 13 et seq. and accompanying text, infra. This may affect the quality and usefulness of the final solution, as described therein.

Region-Growing Methods. In the region-growing technique, a region is started with a single pixel. Adjacent pixels are recursively examined and added to the region if they are sufficiently similar to the region. If a pixel or voxel is too dissimilar to the current region, it is used to start a new region.

One variant of this technique is based on pixel intensities. The mean and scatter of the region and the intensity of the candidate pixel is used to compute a test statistic. When the test statistic is sufficiently small, the pixel is added to the region, and the region's mean and scatter are recomputed. Otherwise, the pixel is rejected, and is used to form a new region.

Graph Partitioning Methods. In the "normalized cuts" method, the image being segmented is modeled as a weighted undirected graph. Each pixel is a node in the graph, and an edge is formed between every pair of pixels. The weight of an edge is a measure of the similarity between the pixels. The image is partitioned into disjoint sets (segments) by removing the edges connecting the segments. The optimal partitioning of the graph is the one that minimizes the weights of the edges that were removed (the "cut"). This algorithm seeks to minimize the "normalized cut", which is the ratio of the "cut" to all of the edges in the set.

Model based Segmentation. By inner forces (ideal: circle) and forces which are computed from the image data, which pull the model towards the object boundary.

Statistical Models: When the object to be segmented is known beforehand, a statistical model can be used to serve as a template.

Multi-scale Segmentation. Image segmentations are computed at multiple scales in scale-space and sometimes propagated from coarse to fine scales.

Segmentation criteria can be arbitrarily complex and may take into account global as well as local criteria. A common requirement is that each region must be connected in some sense.

Semi-automatic Segmentation. In this kind of segmentation, the user outlines the region of interest with the mouse clicks and algorithms are applied so that the path that best fits the edge of the image is shown. Techniques like Livewire or Intelligent Scissors are used in this kind of segmentation.

Neural Networks Segmentation. This type of segmentation relies on processing small areas of an image by the neural network or a set of neural networks. After such processing the decision-taking mechanism marks the areas of an image accordingly to the category recognized by the neural network.

Open Source Software. Several open source software packages are available for performing image segmentation. These include: (i) ITK, available from the Insight Software Consortium, reachable via the universal resource locator formed by combining http://www. with itk.org.; (ii) GNU Image Manipulation Program, or GIMP, a raster graphics editor application with some support for vector graphics. The GIMP project was started in 1995 by Spencer Kimball and Peter Mattis and is now maintained by a group of volunteers; licensed under the GNU General Public License, GIMP is free software and is available through the universal resource locator formed by combining http://www. with gimp.org/; (iii) VXL is available via the universal resource locator formed by combining http://vxl. with sourceforge.net. VXL (the Vision-something-Libraries) is a collection of C++ libraries designed for computer vision research and implementation. VXL is written in ANSI/ISO C++ and is designed to be portable over many platforms; and (iv) ImageMagick is available via the universal resource locator formed by combining http:// and imagemagick.org/.

Models useful in such automated characterization can take many different forms. An approach which uses data from a plurality of similar prior measurements is described below with reference to §IV.

§IV. MODELS

Automatic segmentation and registration of datasets requires usage of initial models which are based on data from multiple prior measurements. This is represented by the block 1810 in the process 1800, described in §V below with reference to FIG. 18. Segmentation is represented by the block 1820.

Segmentation to identify liver tissue may, in accordance with prior art, be based on the assumption that the liver represents the largest volume in the abdomen. This obviously is not true for other organs, and may be inaccurate, in rare cases, for the liver.

As a result, a more sophisticated model is needed in order to identify suitable intensity ranges for various organs in each of the phases. While the intensity of a particular tissue type, such as liver parenchyma, at each phase, will vary from one measurement to another (as described above in §II with reference to FIG. 4), it is possible to create models for the organs which provide the expected intensity range for each given tissue type for all phases. This is described below in more detail with reference to FIGS. 13 through 16.

While single-phase histograms are used in FIGS. 13 through 16 for simplicity of illustration and ease of illustration, it will be appreciated that an arbitrary number of phases N and corresponding N-phase histogram representations may be employed in the context of the present disclosure. In these FIGs., the abscissas typically correspond to Hounsfield Units, but may be normalized to other scales, for example with respect to MRI measurements and processing of images therefrom. Similarly, the ordinates are labeled as corresponding to arbitrary units to reflect that any normalization arrangement may be employed.

Figure 13:
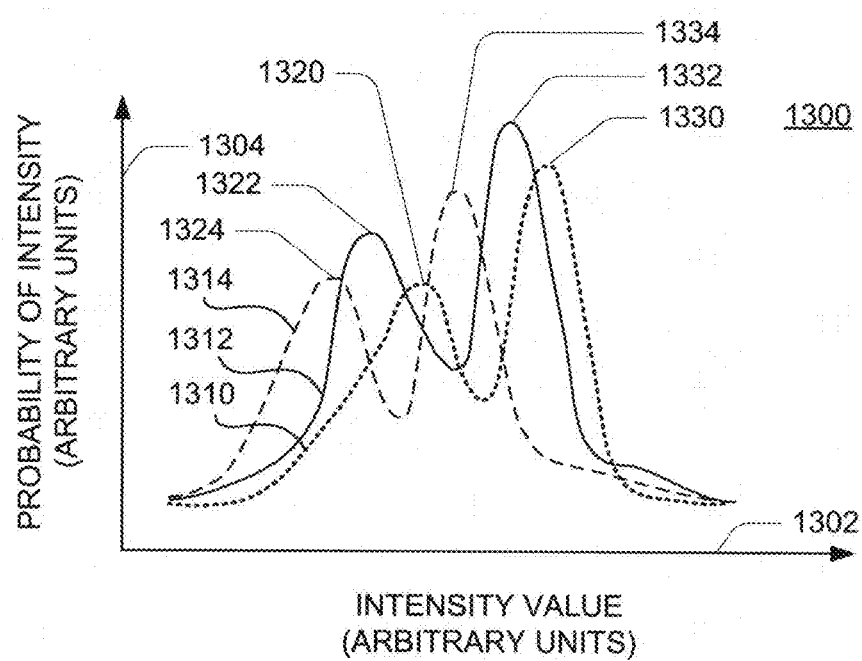
FIG. 13 illustrates histograms belonging to three different examinations, where the X axis represents intensity, and the Y axis represent probability.

FIG. 13 is a graph 1300 displaying single-phase histograms representing data from three measurements, in accordance with an embodiment of the disclosed subject matter. The graph 1300 has an abscissa 1302 corresponding to intensity values (which may be calibrated in HU), and an ordinate 1304 corresponding to the probability of the intensity in the measurement (which may be calibrated in percentages). The three measurements correspond to curves 1310 (dotted trace), 1312 (solid trace) and 1314 (dashed trace). Each of the traces 1310, 1312 and 1314 has two local maxima.

In the curve 1310, and proceeding from left to right, a first local maximum denoted 1320 corresponds to a first organ $O_1$ (not illustrated), and a second local maximum denoted 1330 corresponds to a second organ $O_2$ (not illustrated). In the curve 1312, a first local maximum denoted 1322 corresponds to the first organ $O_1$, and a second local maximum denoted 1332 corresponds to the second organ $O_2$. In the curve 1314, a first local maximum denoted 1324 corresponds to the first organ $O_1$, and a second local maximum denoted 1334 corresponds to the second organ $O_2$.

Figure 14:
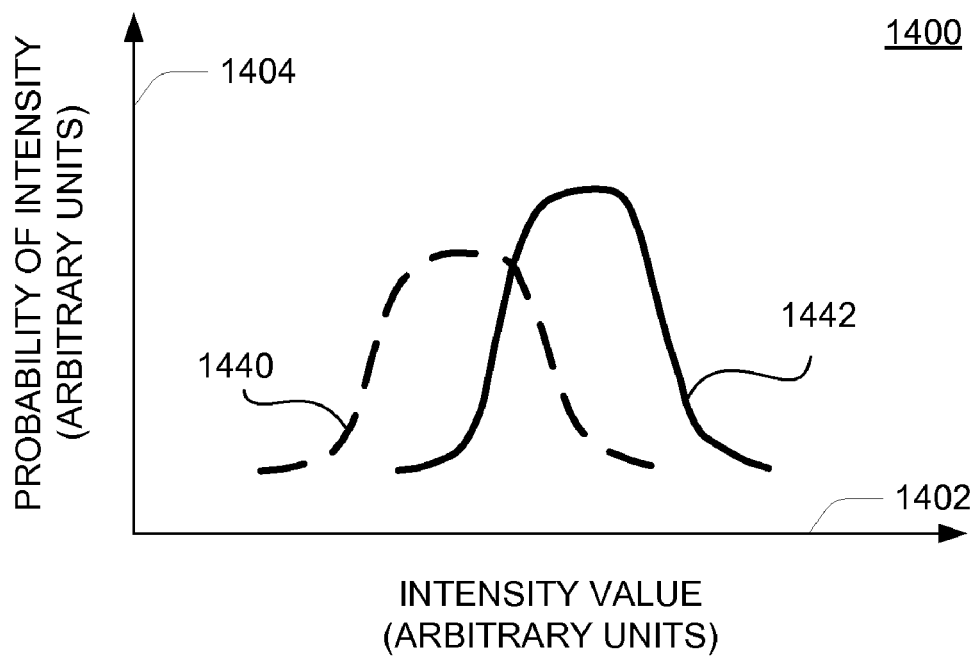
FIG. 14 displays models for two organs, derived from a number of examples, in accordance with an embodiment of the disclosed subject matter.

FIG. 14 is a graph 1400 showing models derived from the data for the two organs $O_1$ and $O_2$ of FIG. 13, in accordance with an embodiment of the disclosed subject matter. The graph 1400 has an abscissa 1402 corresponding to the same intensity values as in FIG. 13, and an ordinate 1404 corresponding to probability of the intensity to represent a given organ (which may be calibrated as percentage, for example).

The graph 1400 also includes a curve 1440 (dashed trace), corresponding to a model for the organ $O_1$, and a curve 1442 (solid trace) corresponding to a model for the organ $O_2$. The models 1440 and 1442 for the organs $O_1$ and $O_2$ were derived from the histograms 1310, 1312 and 1314 of FIG. 13. As can be seen from the curves 1440 and 1442 and from the scatter shown in the graph 400 of FIG. 4, infra, when the models incorporate data from a relatively large number of examinations, there will be significant overlap between them (which means that a given intensity may represent both organs).

Figure 15:
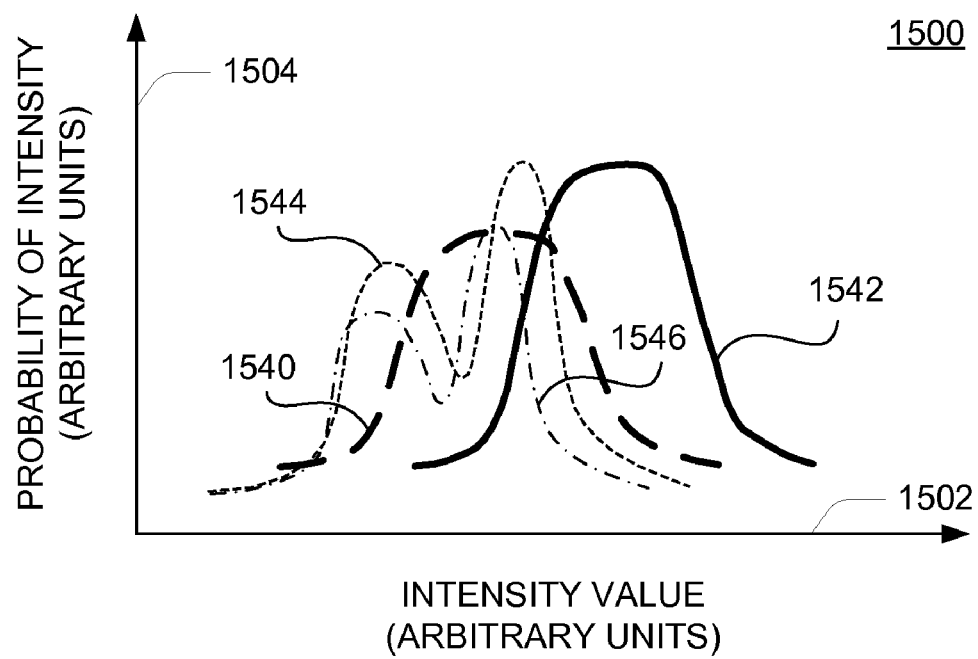
FIG. 15 graphically depicts an example of results when a particular local maximum is assigned to the most similar model (e.g., see FIG. 14) is assigned, in accordance with an embodiment of the disclosed subject matter.

FIG. 15 graphically depicts an example 1500 of results when a particular local maximum is assigned to a most similar model (e.g., see FIG. 14), in accordance with an embodiment of the disclosed subject matter. The graph 1500 has an abscissa 1502 corresponding to the same data elements as in FIGS. 13 and 14, and an ordinate 1504 corresponding to the same characteristics as in FIGS. 13 and 14, with both calibrated in arbitrary units.

The graph 1500 also includes curves 1540 (dashed trace) and 1542 (solid trace), representing the models for the organs $O_1$ and $O_2$, and traces 1544 (trace composed of small dashes) and 1546 (dot-dashed trace). The curve 1544 represents the histogram of a measurement. The curve 1546 corresponds to fitting the curve 1544 to the models representing the organs $O_1$ and $O_2$ by assigning each local maximum to the most similar model.

Figure 16:
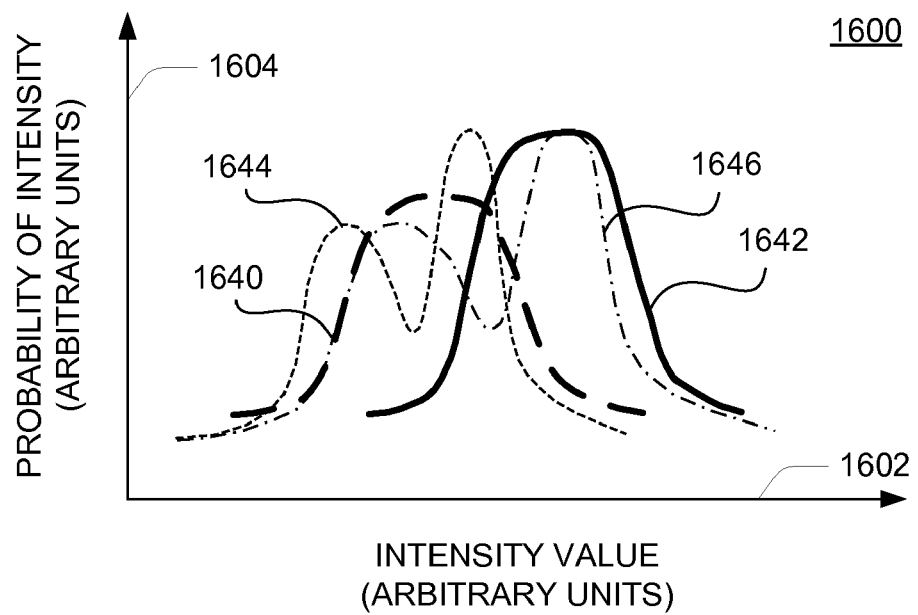
FIG. 16 is a graph showing a better result than that of FIG. 15, obtained by fitting the entire histogram to the set of models, in accordance with an embodiment of the disclosed subject matter.

FIG. 16 is a graph 1600 showing a better result than that of FIG. 15, obtained by fitting the whole histogram to the set of models of FIG. 14, in accordance with an embodiment of the disclosed subject matter. The graph 1600 has an abscissa 1602 corresponding to the same intensities as in FIGS. 13 through 15, and an ordinate 1604 corresponding to the same probability as in FIGS. 14 and 15, again, with both calibrated in the same units as above with respect to FIGS. 13 through 15.

The graph 1600 also includes curves 1640 (dashed trace) and 1642 (solid trace), representing the models 1440 and 1442 of FIG. 14 for the organs $O_1$ and $O_2$, and traces 1644 (trace composed of small dashes) and 1646 (dot-dashed trace). The curve 1644 represents the histogram of a measurement. The curve 1646 corresponds to fitting the curve 1644 to the models representing the organs $O_1$ and $O_2$ to the models 1640 and 1642 by considering the entire histogram (curve 1644).

Figure 17:
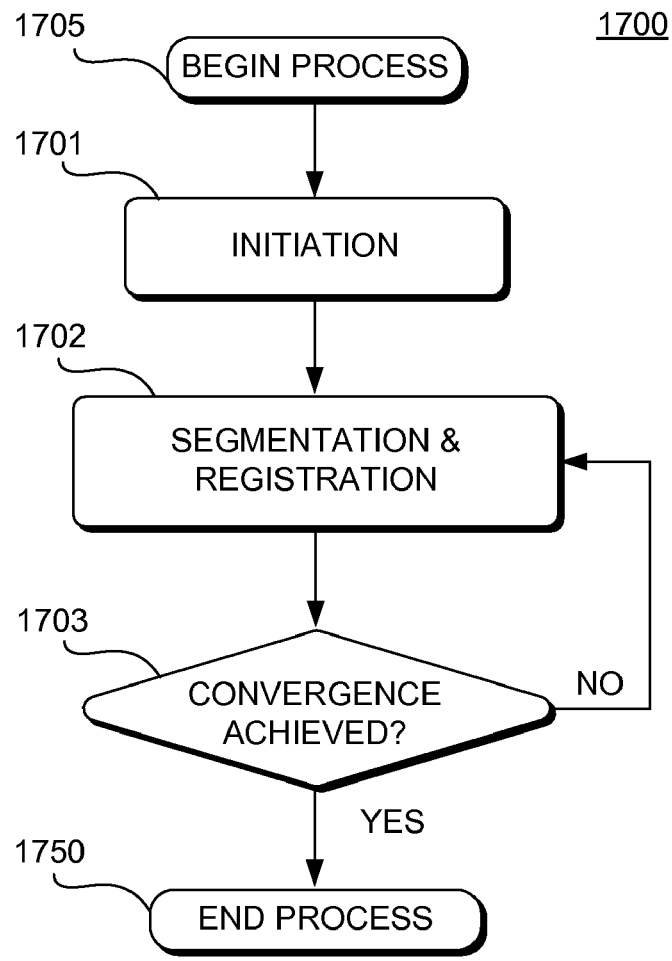
FIG. 17 is a flowchart of a process for registering and segmenting body organs, in accordance with an embodiment of the disclosed subject matter.

Consideration of the entire histogram provides a more accurate designation of the individual local maxima as representing the respective one of the organs $O_1$ and $O_2$ than the type of fitting or segmentation illustrated in FIG. 15. FIGS. 15 and 16 correspond to registration, which is represented in FIG. 17 by block 1702, and in FIG. 18 by block 1802, and more specifically blocks 1815 and 1825. The processes 1700 and 1800 of FIGS. 17 and 18, for automated and contemporaneous segmentation and registration, are described below in more detail in §V.

§V. PROCESSES

The aspects described and disclosed herein may be implemented via processes such as those described below with reference to FIGS. 17 and 18. Processes 1700 and 1800 of FIGS. 17 and 18 may be implemented via computer-readable instructions embodied as computer-readable code on a computer-readable medium (such as the memory devices 150 of FIG. 1, supra) which, when executed by one or more processors (e.g., computer 130 and/or image processing engine 135 of FIG. 1) causes the one or more processors to implement the acts described infra with respect to processes 1700 and 1800, in order to contemporaneously register two or more datasets representative of analogous anatomical portions to provide an integrated or composite dataset which also has been segmented to differentiate the various anatomical features, organs or regions described by the various datasets. The datasets may comprise pixel data, voxel data or other representational forms, and may be derived from any of many different types of instruments developed for the purpose of collecting data representative of anatomical (and often internal) aspects of a patient, such as the test subject 112 depicted in FIG. 1.

A multiphase histogram belonging to the registered images is analyzed to determine suitable intensity ranges for each organ at each phase. The registered images are then segmented based on the multiphase histogram. The registration may or may not include the multiphase histogram, and any of a number of techniques may be used for the segmentation. For example, in some situations, a simple thresholding may provide an appropriate granularity of result, while in other situations, a region-growing module might be initialized with the results from thresholding. Other techniques, including those mentioned and described above with reference to §III, are also applicable.

FIG. 17 is a flowchart outlining a process 1700 for contemporaneously registering and segmenting a plurality of input datasets to integrate descriptive data from each of the multiple input datasets into one or more composite output datasets, in order to increase distinctiveness of a desired feature by advantageously combining relevant and related information in a synergistic manner.

The multiple input datasets are descriptive of substantially the same or corresponding anatomical regions. These multiple input datasets differ in one or more particular, known characteristic(s). For example, the multiple input datasets may differ in terms of when the measurements were made, and/or the phases appropriate to each, and/or which are related in a known fashion, but where each input dataset is each distinguished from one or more other input datasets in one or more characteristics.

As a result of the processes 1700 and 1800, a composite, combinatorial or integrated dataset, derived from the multiple input datasets, is available as an output dataset, which combinatorial dataset may be employed to form images or be used to facilitate automated characterizations in order to render one or more anatomical aspects of interest in greater descriptive detail than is attainable from any of the multiple datasets considered alone, or together but in other, prior art, contexts, and which thus may be employed for further analysis or inspection to provide informational content not previously attainable from the multiple input datasets. Attention is now drawn to FIG. 17, which provides a high-level overview of a process 1700, described in the form of a flowchart.

FIG. 17 flowcharts the process 1700, which is usefully employed for contemporaneously registering and segmenting multiple datasets representing body organs, in accordance with an embodiment of the disclosed subject matter. The process 1700 includes an initiation segment, represented by the block 1701, a segmentation and registration segment 1702, a convergence evaluation segment 1703, a block 1705 representing a beginning and a block 1750 representing an end of the process 1700.

In the block 1705, input data are selected, in the form of multiple but related input datasets. As an example, the datasets represented by the images 200 and 300 of FIGS. 2 and 3, described supra with reference to §II, may represent related but distinct input datasets descriptive of substantially the same anatomical features or anatomical feature types, but which differ in some manner, such that the difference between the multiple input datasets include information which may be advantageously employed to increase the readily available information content derivable from those multiple datasets. Control then passes to the block 1701.

In the block 1701, variables and models are initiated, responsive to the datasets which were input in the block 1705, operator specifications (introduced, for example, via the operator console 140 of FIG. 1), registration transforms are initialized etc., as is described in more detail below with reference to block 1801 of FIG. 18. Control then passes to the block 1702.

In the block 1702, segmentation and registration is carried out. This may involve two or more datasets, and is described below in more detail with reference to block 1802 of FIG. 18. Control then passes to the query task 1703.

In the query task 1703, the process 1700 determines when the tasks associated with the block 1702 have provided an integrated or combined dataset which meets multiple thresholding criteria. This is described below in more detail with reference to block 1803 of FIG. 18. The process 1700 then ends in the block 1750.

When more than two phases are being registered, combined and segmented, the processes 1700 and 1800 are slightly more complex. For example, assume that there are N images or datasets, which belong to different phases of an examination. One dataset or image is selected as a reference, and there are P organs to be segmented.

Figure 18:
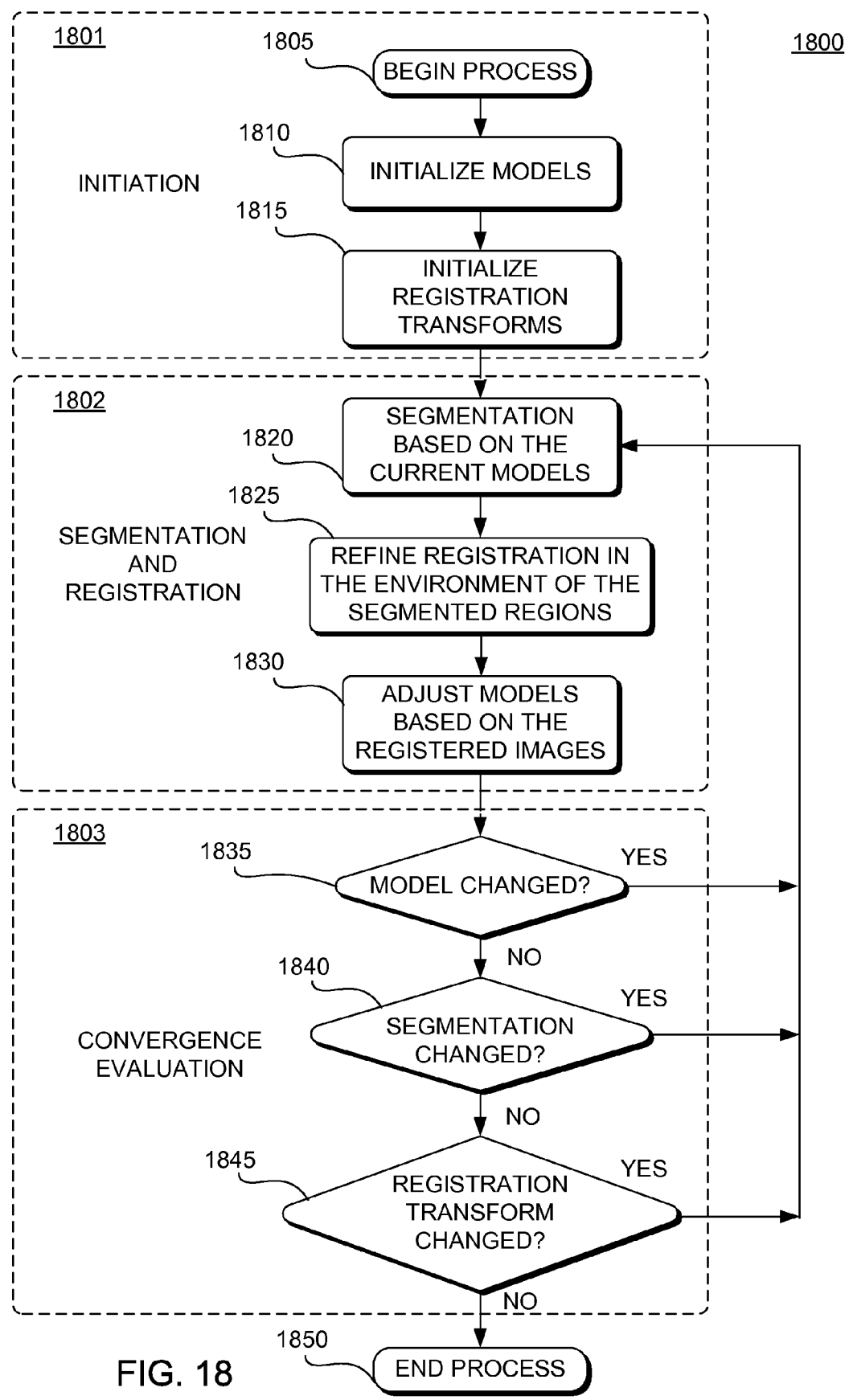
FIG. 18 is a more detailed flowchart of an exemplary process analogous to that of FIG. 17, for registering and segmenting image or volumetric data representative of body organs, in accordance with an embodiment of the disclosed subject matter.

FIG. 18 and accompanying text flesh out the high-level description provided above with reference to FIG. 17. The process 1800 begins in a block 1805, illustrated within the initiation block 1801, for example via inputting of multiple datasets $I_1, I_2, \ldots, I_N$, each representing a portion of the data to be registered and segmented. For example, the datasets corresponding to the images 200 and 300 of FIGS. 2 and 3, respectively, each representing the same anatomical regions, albeit at arterial and venous phases, respectively, could comprise the multiple input datasets. In one embodiment, the multiple datasets each are formed from a plurality of pixels. In one embodiment, the multiple datasets each are formed from a plurality of voxels.

The block 1805 may also include accepting operator-specified data for selecting organs to be modeled and other parameters. The block 1805 may further also include interpretation of data contained in a DICOM or other standardized header. The header information might include description including slice position data, indicia identifying the patient, the view, the type of instrument employed to gather the dataset(s) and date/time/phase et cetera information descriptive of the measurement which resulted in the specific dataset(s) associated with that file header. Control then passes to a block 1810.

In the block 1810, models for organs associated with the datasets (as exemplified by curves 1440 and 1442 of FIG. 14, supra) are initialized. For example, a set of models ($M_1$, $M_2$, ..., $M_P$) according to be segmented and the modality of measurement (e.g., CT scan, MRI, ultrasound, etc.) and view may be initialized. Control then passes to a block 1815.

In the block 1815, the process 1800 obtains N−1 initial registration transforms ($T_2$, $T_3$, ..., $T_N$). For the special case where it is known a priori that the multiple input datasets are registered, the initial registration transforms may be unity. Some of the initial conditions appropriate to registration are described with reference to FIGS. 14 and 15, supra. When more than two phases are available, for example, when N many phases are to be combined, the registration initiation should initiate N−1 transformations.

This can be done in at least two ways, depending on how the images are to be registered. One way is to consider the problem as N−1 two-phase registrations with reference to a selected phase. Another way is to update all N−1 transforms, again with reference to a selected phase, and recalculate the N-phase histogram in one iteration of the registration method. Control then passes to the block 1802, where segmentation and registration are accomplished.

In the block 1802, a block 1820 carries out segmentation, based on the current models. During a first pass, stored model data are employed, and, in a process of iteration of the blocks 1802 and 1803, the models may be refined and fitted to the present group of datasets. Control passes from the block 1820 to a block 1825.

In the block 1825, the registration of the two or more datasets is refined in the environment of the segmented regions. This is done by refining the registration transforms (except for the special case where the multiple images are known to be registered a priori). For all $2 \leq n \leq N$, the transform $T_n$ is refined in the environment of the segmented organ regions. In the special case where it is known that the multiple measured images are already registered, the effect is as though the block 1825 was omitted.

In one iteration, the reference dataset or image is initially segmented (block 1820) based on the current images and the current set of models (from the block 1810) during a first iteration of the blocks 1802 and 1803. The result of the initial segmentation defines a region of interest for each organ, within which the registration can be refined or adjusted (block 1825). After adjusting the registration, the models can be also refined (block 1830), which allows a more accurate segmentation in the next iteration of the blocks 1802 and 1803.

This framework can be implemented using any segmentation method and any registration method with any type of transformation, which may (or may not) exploit the advantages of multiphase histogram analysis. Control then passes to a block 1830.

In the block 1830, the models are adjusted or refined based on the two or more registered datasets. In one embodiment, the N-phase histogram based on the images $I_1$, $T_2(I_2)$, ..., $T_N(I_N)$ is created. Then, for all $1 \leq p \leq P$, parameters for the model $M_p$ are refined such that the set of models $M_1$, $M_2$, ..., $M_P$ fit the different local maxima of the N-phase histogram. Control then passes to the block 1803 for convergence testing.

In the block 1803, a query task 1835 compares the present organ models to the organ models from the most recent prior iteration. When the query task 1835 determines that there has been a change in the models (from the block 1830) which exceeds a first programmable threshold, control reverts to the block 1820. When the query task 1835 determines that there has not been a change in the models which exceeds the first threshold, control passes to a query task 1840.

In the query task 1840, the process 1800 determines when the segmentation has changed between the results from this iteration and those from the most recent prior iteration. When the query task 1840 determines that there has been a change in segmentation (from the block 1820) which exceeds a second programmable threshold, control reverts to the block 1820, and the process 1800 iterates the tasks associated with the blocks 1802 and 1803. When the query task 1840 determines that there has not been a change in segmentation which exceeds the second threshold, control passes to a query task 1845.

In the query task 1845, the process 1800 determines when the registration has changed between the results of the current iteration and the results of an immediately prior iteration. When the query task 1845 determines that there has been a change in the registration transform (from the block 1825) which exceeds a third programmable threshold, control reverts to the block 1820, as described above. When the query task 1845 determines that there has not been a change in the registration transform which exceeds the third threshold, the process 1800 has converged, resulting in a composite dataset (as exemplified by the image 700 of FIG. 7), formed by combining the datasets for the two phases represented by the images 500 and 600 of FIGS. 5 and 6, respectively. The process 1800 then provides that composite dataset for further analysis and ends in a block 1850.

The process 1800 thus provides improved, automated registration of multiple datasets coupled with segmentation of a dataset formed by combining the multiple datasets to realize ready distinction of pathological lesions from background anatomical data, and promoting robust discrimination and subsequent quantification of potential pathology from anatomical data. An example of a computer useful in implementing this type of process is described below with reference to §VI.

§VI. HARDWARE AND OPERATING ENVIRONMENT

Figure 19:
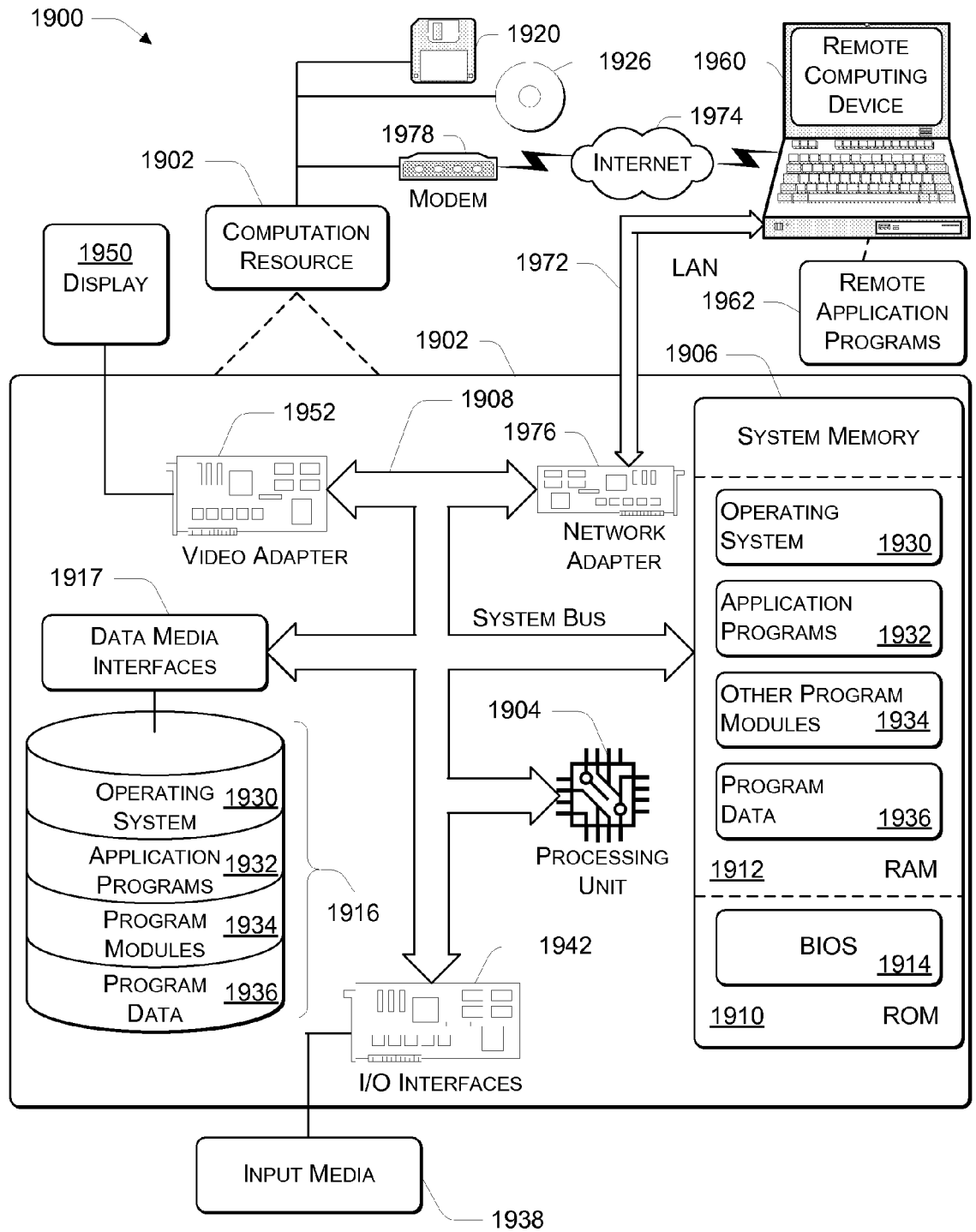
FIG. 19 illustrates an example of a general computation resource useful in the context of the environment of FIG. 1, in accordance with an embodiment of the disclosed subject matter.

FIG. 19 illustrates an example of a general computer environment 1900 useful in the context of the environment of FIG. 1, in accordance with an embodiment of the disclosed subject matter. The general computer environment 1900 includes a computation resource 1902 capable of implementing the processes described herein. It will be appreciated that other devices may alternatively used that include more components, or fewer components, than those illustrated in FIG. 19.

The illustrated operating environment 1900 is only one example of a suitable operating environment, and the example described with reference to FIG. 19 is not intended to suggest any limitation as to the scope of use or functionality of the embodiments of this disclosure. Other well-known computing systems, environments, and/or configurations may be suitable for implementation and/or application of the subject matter disclosed herein.

The computation resource 1902 includes one or more processors or processing units 1904, a system memory 1906, and a bus 1908 that couples various system components including the system memory 1906 to processor(s) 1904 and other elements in the environment 1900. The bus 1908 represents one or more of any of several types of bus structures, including a memory bus or memory controller, a peripheral bus, an accelerated graphics port and a processor or local bus using any of a variety of bus architectures, and may be compatible with SCSI (small computer system interconnect), or other conventional bus architectures and protocols.

The system memory 1906 includes nonvolatile read-only memory (ROM) 1910 and random access memory (RAM) 1912, which may or may not include volatile memory elements. A basic input/output system (BIOS) 1914, containing the elementary routines that help to transfer information between elements within computation resource 1902 and with external items, typically invoked into operating memory during start-up, is stored in ROM 1910.

The computation resource 1902 further may include a non-volatile read/write memory 1916, represented in FIG. 19 as a hard disk drive, coupled to bus 1908 via a data media interface 1917 (e.g., a SCSI, ATA, or other type of interface); a magnetic disk drive (not shown) for reading from, and/or writing to, a removable magnetic disk 1920 and an optical disk drive (not shown) for reading from, and/or writing to, a removable optical disk 1926 such as a CD, DVD, or other optical media.

The non-volatile read/write memory 1916 and associated computer-readable media provide nonvolatile storage of computer-readable instructions, data structures, program modules and other data for the computation resource 1902. Although the exemplary environment 1900 is described herein as employing a non-volatile read/write memory 1916, a removable magnetic disk 1920 and a removable optical disk 1926, it will be appreciated by those skilled in the art that other types of computer-readable media which can store data that is accessible by a computer, such as magnetic cassettes, FLASH memory cards, random access memories (RAMs), read only memories (ROM), and the like, may also be used in the exemplary operating environment.

A number of program modules may be stored via the non-volatile read/write memory 1916, magnetic disk 1920, optical disk 1926, ROM 1910, or RAM 1912, including an operating system 1930, one or more application programs 1932, other program modules 1934 and program data 1936. Examples of computer operating systems conventionally employed for some types of three-dimensional and/or two-dimensional medical image data include the NUCLEUS® operating system, the LINUX® operating system, and others, for example, providing capability for supporting application programs 1932 using, for example, code modules written in the C++® computer programming language.

A user may enter commands and information into computation resource 1902 through input devices such as input media 1938 (e.g., keyboard/keypad, tactile input or pointing device, mouse, foot-operated switching apparatus, joystick, touchscreen or touchpad, microphone, antenna etc.). Such input devices 1938 are coupled to the processing unit 1904 through a conventional input/output interface 1942 that is, in turn, coupled to the system bus. A monitor 1950 or other type of display device is also coupled to the system bus 1908 via an interface, such as a video adapter 1952.

The computation resource 1902 may include capability for operating in a networked environment (as illustrated in FIG. 1, for example) using logical connections to one or more remote computers, such as a remote computer 1960. The remote computer 1960 may be a personal computer, a server, a router, a network PC, a peer device or other common network node, and typically includes many or all of the elements described above relative to the computation resource 1902. In a networked environment, program modules depicted relative to the computation resource 1902, or portions thereof, may be stored in a remote memory storage device such as may be associated with the remote computer 1960. By way of example, remote application programs 1962 reside on a memory device of the remote computer 1960. The logical connections represented in FIG. 19 may include interface capabilities, e.g., such as interface capabilities 152 (FIG. 1) a storage area network (SAN, not illustrated in FIG. 19), local area network (LAN) 1972 and/or a wide area network (WAN) 1974, but may also include other networks.

Such networking environments are commonplace in modern computer systems, and in association with intranets and the Internet. In certain embodiments, the computation resource 1902 executes an Internet Web browser program (which may optionally be integrated into the operating system 1930), such as the "Internet Explorer®" Web browser manufactured and distributed by the Microsoft Corporation of Redmond, Wash.

When used in a LAN-coupled environment, the computation resource 1902 communicates with or through the local area network 1972 via a network interface or adapter 1976. When used in a WAN-coupled environment, the computation resource 1902 typically includes interfaces, such as a modem 1978, or other apparatus, for establishing communications with or through the WAN 1974, such as the Internet. The modem 1978, which may be internal or external, is coupled to the system bus 1908 via a serial port interface.

In a networked environment, program modules depicted relative to the computation resource 1902, or portions thereof, may be stored in remote memory apparatus. It will be appreciated that the network connections shown are exemplary, and other means of establishing a communications link between various computer systems and elements may be used.

A user of a computer may operate in a networked environment 100 using logical connections to one or more remote computers, such as a remote computer 1960, which may be a personal computer, a server, a router, a network PC, a peer device or other common network node. Typically, a remote computer 1960 includes many or all of the elements described above relative to the computer 1900 of FIG. 19.

The computation resource 1902 typically includes at least some form of computer-readable media. Computer-readable media may be any available media that can be accessed by the computation resource 1902. By way of example, and not limitation, computer-readable media may comprise computer storage media and communication media.

Computer storage media include volatile and nonvolatile, removable and non-removable media, implemented in any method or technology for storage of information, such as computer-readable instructions, data structures, program modules or other data. The term "computer storage media" includes, but is not limited to, RAM, ROM, EEPROM, FLASH memory or other memory technology, CD, DVD, or other optical storage, magnetic cassettes, magnetic tape, magnetic disk storage or other magnetic storage devices, or any other media which can be used to store computer-intelligible information and which can be accessed by the computation resource 1902.

Communication media typically embodies computer-readable instructions, data structures, program modules or other data, represented via, and determinable from, a modulated data signal, such as a carrier wave or other transport mechanism, and includes any information delivery media. The term "modulated data signal" means a signal that has one or more of its characteristics set or changed in such a manner as to encode information in the signal in a fashion amenable to computer interpretation.

By way of example, and not limitation, communication media include wired media, such as wired network or direct-wired connections, and wireless media, such as acoustic, RF, infrared and other wireless media. The scope of the term computer-readable media includes combinations of any of the above.

The computer 1902 may function as one or more of the control segments of module 120 (FIG. 1), the computer 130, the operator console 140 and/or the data acquisition and conditioning module 160, for example, via implementation of the processes 1700 and 1800 of FIGS. 17 and 18, respectively, as one or more computer program modules. A conclusion is presented below in §VII.

§VII. CONCLUSION

The disclosed examples combine a number of useful features and present advantages in modern hospital settings. These examples address, among other things, a key problem with segmenting and quantifying lesions, and particularly liver lesions, due to a lack of repeatability. The inconsistent repeatability results from a number of causes, including various inconsistencies in the contrast uptakes of the lesions due to variations in timing between contrast agent injection and/or variations in timing of the phases, and the imaging. The combination of multiple contrast-agent enhanced datasets taught by the present disclosure provides additional enhancement of the anatomy to create a more robust contrast between the lesion and the surrounding parenchyma. In turn, this tends to improve consistent segmentation and quantification that can be relied on for growth/change analysis, surgical planning, radiotherapy planning and other purposes.

Additionally, compatibility with existing tools and modes for image data representation, and conventional image data storage and exchange standards facilitate interoperability with existing modules developed for those purposes, as well as promoting compatibility with newer approaches, such as integrated surgical navigation. The disclosed capabilities also benefit from compatibility with existing systems, and thus coordinate with other operator training, reducing probability of error, such as may occur in time-critical scenarios.

Although specific embodiments have been illustrated and described herein, it will be appreciated by those of ordinary skill in the art that any arrangement which is calculated to achieve the same purpose may be substituted for the specific embodiments shown. This disclosure is intended to cover any adaptations or variations. For example, although described in procedural terms, one of ordinary skill in the art will appreciate that implementations can be made in a procedural design environment or any other design environment that provides the required relationships.

In particular, one of skill in the art will readily appreciate that the names or labels of the processes and apparatus are not intended to limit embodiments. Furthermore, additional processes and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future communication devices, different file systems, and new data types. The terminology used in this disclosure is meant to include all object-oriented, database and communication environments and alternate technologies which provide the same functionality as described herein.

What is claimed is:

1. A system for combining multiple datasets to provide a composite dataset, comprising:
   a data collection tool;
   a computation engine and a memory coupled to the data collection tool; and
   computer-readable code embodied on a computer-readable medium and configured so that when the computer-readable code is executed by one or more processors associated with the computation engine the computer-readable code causes the one or more processors to:
      accept two or more datasets corresponding to different contrast agent imaging phases of a subject;
      initiate processing of the two or more datasets;
      contemporaneously segment and register a combination of the two or more datasets to achieve a combined dataset;
      test for convergence of the combined dataset by assigning pixels in the combined dataset to a pixel cluster; and
      provide the combined dataset for analysis when the test for convergence indicates that the combined dataset has been registered and segmented.

2. The system of claim 1, wherein the computer readable code is further configured so that, when executed by the one or more processors, the computer readable code configured to cause the one or more processors to:
   initialize a group of models for organs; and
   initialize registration transforms for co-locating corresponding portions of each of the two or more datasets.

3. The system of claim 1, wherein the computer readable code is further configured so that, when executed by the one or more processors, the computer readable code configured to cause the one or more processors to:
   segment a dataset representing a combination of the two or more datasets in conformance with a current set of organ models;
   refine registration of the two or more datasets in an environment including segmented regions to register the two or more datasets; and
   adjust the organ models based on the refined registration.

4. The system of claim 1, wherein the computer readable code is further configured so that, when executed by the one or more processors, the computer readable code configured to cause the one or more processors to determine when the organ models have changed by more than a first threshold amount, and, when the organ models have changed by more than the first threshold amount, iteratively segment and register and execute subsequent acts.

5. The system of claim 1, wherein the computer readable code is further configured so that, when executed by the one or more processors, the computer readable code configured to cause the one or more processors to evaluate whether segmentation has changed by more than a second threshold amount, and, when the segmentation has changed by more than the second threshold, iteratively segment and register and execute subsequent acts.

6. The system of claim 1, wherein the computer readable code is further configured so that, when executed by the one or more processors, the computer readable code configured to cause the one or more processors to assess when the registration transforms have changed by more than a third threshold amount, and, when the registration transforms have changed by more than a third threshold amount, iteratively segment and register and execute subsequent acts.

7. The system of claim 1, wherein the computer readable code is further configured so that, when executed by the one or more processors, the computer readable code configured to cause the one or more processors to:
   determine when the organ models have changed by more than a first threshold amount, and, when the organ models have changed by more than the first threshold amount, iteratively segment and register and execute subsequent acts, and, when the organ models have not changed by more than the first threshold amount, to:
   evaluate whether segmentation has changed by more than a second threshold amount, and, when the segmentation has changed by more than the second threshold, iteratively segment and register and execute subsequent acts; and when segmentation has not changed by more than the second threshold amount, to:
   assess when the registration transforms have changed by more than a third threshold amount, and, when the registration transforms have changed by more than a third threshold amount, iteratively segment and register and execute subsequent acts, and, when the registration transforms have not changed by more than the third threshold amount, to provide a registered and segmented composite dataset.

8. An apparatus for:
   accepting two or more datasets derived from voxels corresponding to digitized versions of distinct measurements of a subject;
   initiating processing of the two or more datasets corresponding to different contrast agent imaging phases;
   contemporaneously segmenting and registering a combination of the two or more datasets to achieve a combined dataset;
   testing for convergence of the combined dataset by assigning pixels in the combined dataset to a pixel cluster; and
   providing a composite dataset, derived from the combined dataset, for analysis, when testing indicates that the combined dataset has been registered and segmented.

9. The apparatus of claim 8, wherein the apparatus for initiating includes modules for:
   initializing a group of models for organs; and
   initializing registration transforms for co-locating corresponding portions of each of the two or more datasets.

10. The apparatus of claim 8, wherein the apparatus for segmenting and registering includes modules for:
    segmenting a dataset representing a combination of the two or more datasets in conformance with a current set of organ models to realize segmented regions;
    refining registration of the two or more datasets in an environment of segmented regions to provide two or more registered datasets; and
    adjusting the organ models based on the registered two or more datasets.

11. The apparatus of claim 8, wherein the apparatus for evaluating convergence includes a module for determining when the organ models have changed by more than a first threshold amount, and, when the organ models have changed by more than the first threshold amount, iterate segmenting and registering and subsequent acts.

12. The apparatus of claim 8, wherein the apparatus for evaluating convergence includes one or more modules for:
    determining when the organ models have changed by more than a first threshold amount, and, when the organ models have changed by more than the first threshold amount, iterating segmenting and registering and subsequent acts, and, when the organ models have not changed by more than the first threshold amount, for:
    evaluating when segmenting has resulted in a combined dataset which has changed by more than a second threshold amount, and, when segmenting has resulted in a combined dataset which has changed by more than the second threshold, iterating segmenting and registering and subsequent acts.

13. The apparatus of claim 8, wherein the apparatus for evaluating convergence includes one or more modules for:
    determining when the organ models have changed by more than a first threshold amount, and, when the organ models have changed by more than the first threshold amount, iterating segmenting and registering and subsequent acts, and, when the organ models have not changed by more than the first threshold amount, for:
    evaluating when segmenting has resulted in a combined dataset which has changed by more than a second threshold amount, and, when segmenting has resulted in a combined dataset which has changed by more than the second threshold, iterating segmenting and registering and subsequent acts; and when segmenting has not resulted in a combined dataset which has changed by more than the second threshold amount, for:
    assessing when registration transforms have changed by more than a third threshold amount, and, when the registration transforms have changed by more than a third threshold amount, iterating segmenting and registering and subsequent acts, and, when the registration transforms have not changed by more than the third threshold amount, providing a registered and segmented composite dataset.

14. The apparatus of claim 8, wherein the apparatus comprises computer-readable instructions embodied on a storage medium and coupled to one or more processors for executing the instructions to effectuate accepting, initiating, testing and providing.

15. A method for contemporaneously registering and segmenting multiple input datasets to provide an integrated dataset formed from the multiple input datasets, the method comprising:
    accepting two or more datasets derived from data corresponding to digitized versions of distinct contrast agent phase measurements of a subject;
    initiating processing of the two or more datasets using an image processing engine;
    contemporaneously segmenting and registering a combination of the two or more datasets to achieve a combined dataset using the image processing engine;
    testing for convergence of the combined dataset using the image processing engine by assigning pixels in the combined dataset to a pixel cluster; and
    providing, using the image processing engine, a composite dataset, formed using the combined dataset, for further analysis, when testing indicates that the combined dataset has been appropriately registered and segmented.

16. The method of claim 15, wherein initiating includes:
    initializing a group of models for organs; and
    initializing registration transforms for co-locating corresponding portions of each of the two or more datasets.

17. The method of claim 15, wherein segmenting and registering includes:
    segmenting a dataset representing a combination of the two or more datasets in conformance with a current set of organ models to realize segmented regions;

refining registration of the two or more datasets in an environment of segmented regions to provide two or more registered datasets; and adjusting the organ models based on two or more registered datasets.

18. The method of claim 15, wherein registering includes refining registration of the two or more datasets in an environment of the segmented regions to provide the combined dataset.

19. The method of claim 15, wherein the process is represented as computer-readable instructions embodied on a storage medium and is capable of being coupled to one or more processors for executing the instructions to effectuate accepting, initiating, testing and providing.

20. The method of claim 15, wherein evaluating convergence comprises:

determining when the organ models have changed by more than a first threshold amount, and, when the organ models have changed by more than the first threshold amount, iterating segmenting and registering and subsequent acts, and, when the organ models have not changed by more than the first threshold amount, for:

evaluating when segmenting has resulted in a composite dataset which has changed by more than a second threshold amount, and, when the composite dataset has changed by more than the second threshold, iterating segmenting and registering and subsequent acts; and when the composite dataset which has not changed by more than the second threshold amount, for:

assessing when the registration transforms have changed by more than a third threshold amount, and, when the registration transforms have changed by more than a third threshold amount, iterating segmenting and registering and subsequent acts, and, when the registration transforms have not changed by more than the third threshold amount, providing a registered and segmented composite dataset.

21. A process for segmenting multiple registered input datasets each corresponding to a measurement to provide an integrated dataset formed from the multiple registered input datasets, the process including:

accepting two or more registered datasets derived from data corresponding to digitized versions of distinct biological phase measurements of a subject;

initiating processing of the two or more datasets using an image processing engine;

segmenting a combination of the two or more registered datasets to achieve a combined dataset using the image processing engine; and providing a composite dataset, formed using the combined dataset, for further analysis, when the combined dataset has been appropriately segmented.

22. The process of claim 21, wherein initiating comprises initiating modules for initializing a group of models for organs.

23. The process of claim 21, wherein segmenting and registering includes:

segmenting a dataset representing a combination of the two or more registered datasets in conformance with a current set of organ models to realize segmented regions; and adjusting the organ models based on two or more registered datasets.

24. The system of claim 1, wherein to accept two or more datasets corresponding to different biological imaging phases of a subject, the computer readable medium further causes the processor to accept a first dataset corresponding to a venous imaging phase of the subject and a second dataset corresponding to an arterial imaging phase of the subject.

25. The system of claim 1, wherein to test for convergence, the computer readable medium further causes the processor to:

(a) pick a first set of clusters, each cluster having a cluster center;

(b) assign each pixel in the combined dataset to a cluster in the set of clusters that minimizes the variance between the assigned pixel and the cluster center;

(c) compute a second set of cluster centers based on the assigned pixels; and (d) repeat steps b and c until the pixels have converged.

* * * * *